US011461260B2

(12) United States Patent
Pinto et al.

(10) Patent No.: US 11,461,260 B2
(45) Date of Patent: Oct. 4, 2022

(54) MEMORY CARD OPERABLE WITH MULTIPLE HOST INTERFACES

(71) Applicant: Western Digital Technologies, Inc., San Jose, CA (US)

(72) Inventors: Yoseph Pinto, Tel Aviv (IL); Shiva K, Bangalore (IN); Eldhose Peter, Bangalore (IN); Rakesh Balakrishnan, Bangalore (IN)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 17/179,953

(22) Filed: Feb. 19, 2021

(65) Prior Publication Data

US 2022/0269629 A1 Aug. 25, 2022

(51) Int. Cl.
*G06F 13/38* (2006.01)
*G06F 13/40* (2006.01)
*G06F 1/26* (2006.01)
*G06F 1/08* (2006.01)

(52) U.S. Cl.
CPC .............. *G06F 13/385* (2013.01); *G06F 1/08* (2013.01); *G06F 1/266* (2013.01); *G06F 13/387* (2013.01); *G06F 13/409* (2013.01); *G06F 13/4068* (2013.01); *G06F 2213/0026* (2013.01)

(58) Field of Classification Search
CPC ............................ H05K 5/026; G06K 19/077
See application file for complete search history.

(56) References Cited

U.S. PATENT DOCUMENTS

| 2004/0164170 | A1 | 8/2004 | Krygier et al. |
| 2013/0012049 | A1 | 1/2013 | Pinto et al. |
| 2013/0013836 | A1 | 1/2013 | Pinto et al. |
| 2019/0050022 | A1 | 2/2019 | Tzafrir |
| 2019/0138440 | A1 | 5/2019 | Lee |
| 2019/0182954 | A1 | 6/2019 | Sirajudeen et al. |
| 2019/0205277 | A1* | 7/2019 | Koh ................... G06F 13/4081 |
| 2019/0287630 | A1* | 9/2019 | Han ..................... G11C 16/30 |
| 2020/0090020 | A1* | 3/2020 | Fujimoto ......... G06K 19/07732 |

(Continued)

OTHER PUBLICATIONS

Samsung, "Samsung UFS Card: State-of-the-Art Storage Card Delivering Superior Performance and Reliability: SSD Performance in a Memory Card," White Paper, Jul. 2018, 16 pages.

(Continued)

*Primary Examiner* — Idriss N Alrobaye
*Assistant Examiner* — Ronald T Modo
(74) *Attorney, Agent, or Firm* — Vierra Magen Marcus LLP

(57) ABSTRACT

A memory card has a plurality of pads including a first set of pads located to connect with host contacts arranged in a first configuration for communication according to the micro Secure Digital (microSD) standard, a second set of pads located to connect with host contacts arranged in a second configuration for communication according to the Peripheral Component Interface express (PCIe) protocol, and a third set of pads located to connect with host contacts arranged in a third configuration for communication according to the Universal Flash Storage (UFS) standard. The plurality of pads includes one or more common pads that are common to the second set of pads and the third set of pads.

20 Claims, 19 Drawing Sheets

(56) References Cited

U.S. PATENT DOCUMENTS

2020/0250346 A1  8/2020 Sasidharan et al.
2020/0413531 A1* 12/2020 Wallash ................. H05K 1/181

OTHER PUBLICATIONS

SD Association, "SD Express (SD7.x)—Host Implementation Guideline," Design Guide, May 2020, 21 pages.
SD Association, "SD Express and microSD Express Memory Cards: The Best Choice for Your Future Product Designs," White Paper, Feb. 2019, 11 pages.
Amphenol ICC, "Universal Flash Storage (UFS) Connector: Next-Generation Memory Card; Backward Compatible," Brochure, Aug. 2017, 2 pages.
Amphenol ICC, "microSD Express Connector: High Performance Memory Card Connector Compliant to SD Specification V7.1," Brochure, Aug. 2019, 2 pages.
SD Association,"SD Express Memory Cards with PCIe and NVMe Interfaces," White Paper, Feb. 2019, 10 pages.
SD Association,"SD Express Memory Cards with PCIe and NVMe Interfaces," White Paper, May 2020, 10 pages.

* cited by examiner

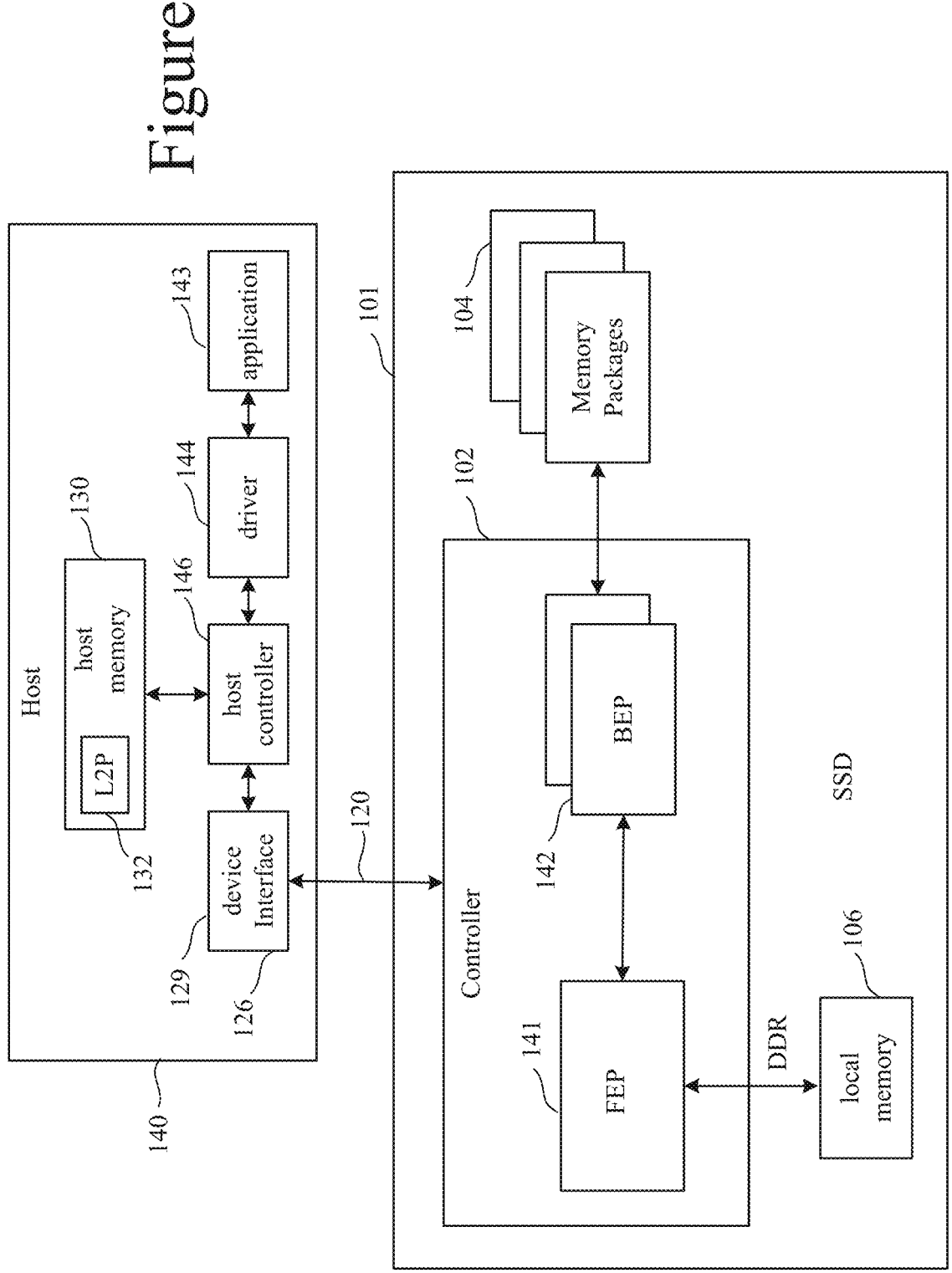

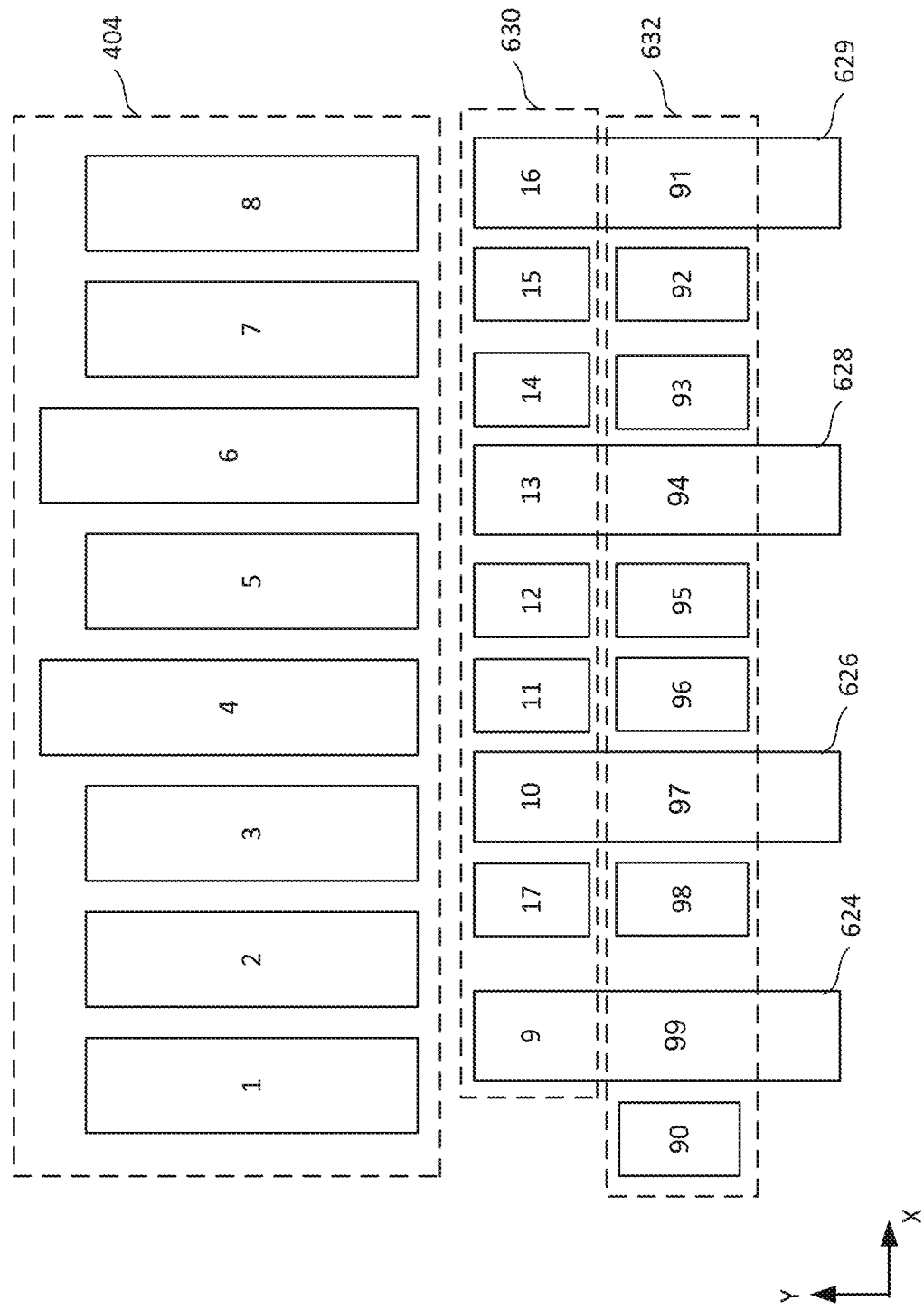

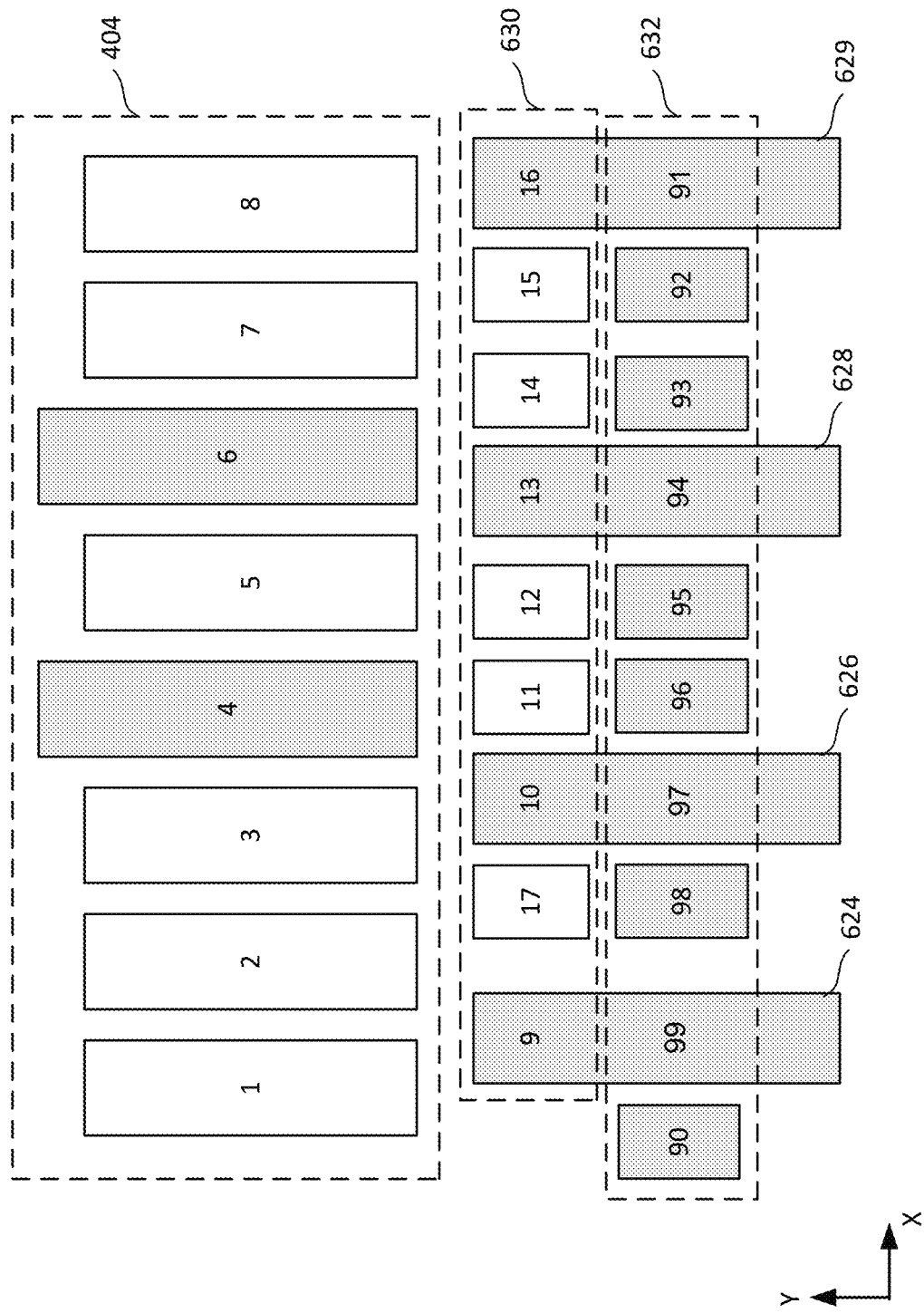

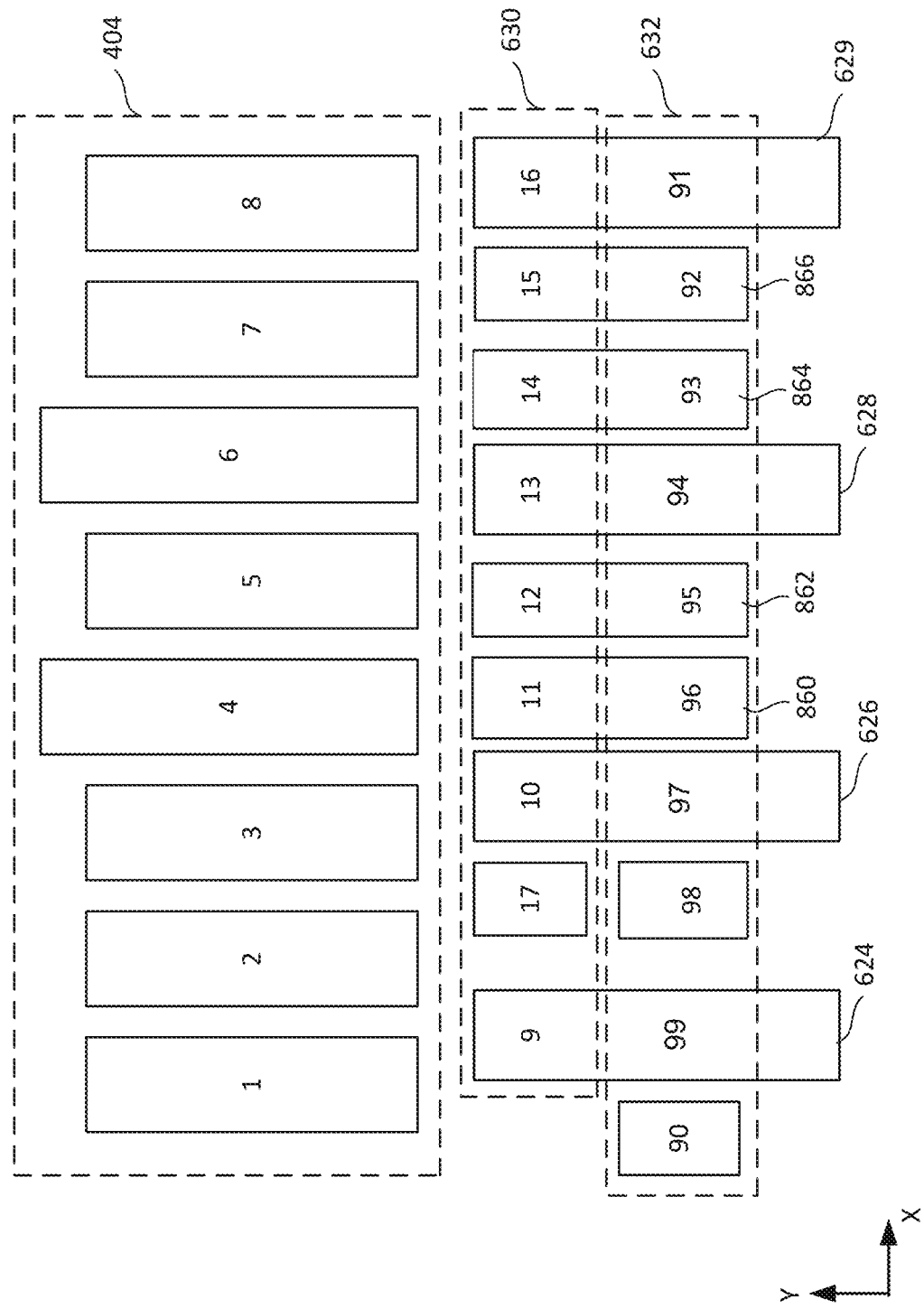

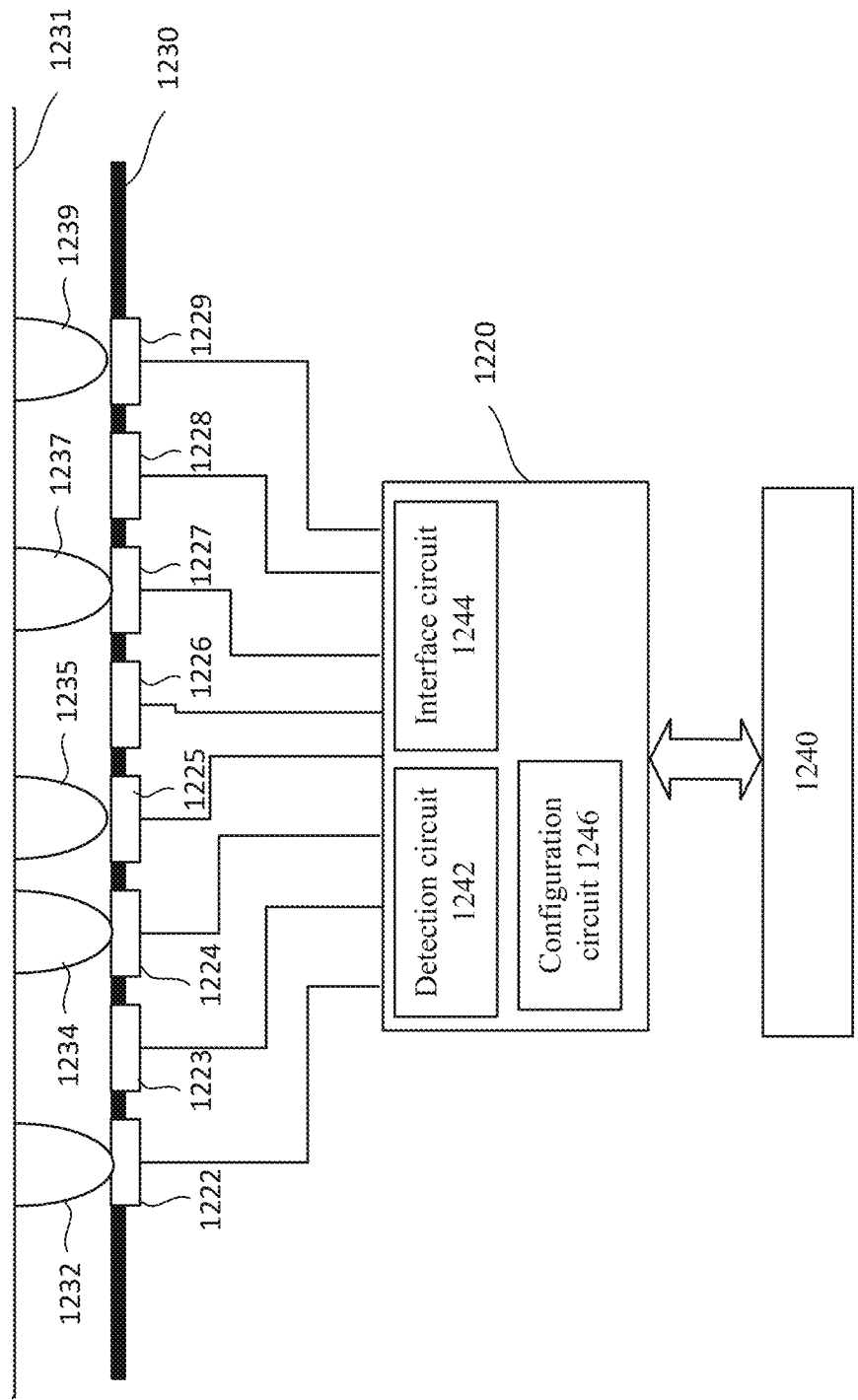

MEMORY CARD OPERABLE WITH MULTIPLE HOST INTERFACES

BACKGROUND

The present technology relates to memory cards and their operation.

Semiconductor memory devices have become more popular for use in various electronic devices. For example, non-volatile semiconductor memory is used in cellular telephones, digital cameras, personal digital assistants, mobile computing devices, non-mobile computing devices and other devices (host devices).

A memory device includes memory cells, which may be arranged in series, in NAND strings, for instance, where select gate transistors are provided at the ends of the NAND string to selectively connect a channel of the NAND string to a source line or bit line.

A charge-storing material such as a floating gate or a charge-trapping material can be used in such memory devices to store a charge which represents a data state. A charge-trapping material can be arranged vertically in a three-dimensional (3D) stacked memory structure, or horizontally in a two-dimensional (2D) memory structure. One example of a 3D memory structure is the Bit Cost Scalable (BiCS) architecture which comprises a stack of alternating conductive and dielectric layers.

A memory device may be in the form of a memory card that is configured to be removably coupled to host devices using an interface. For example, pads on a memory card may physically contact and electrically connect with corresponding host contacts of a host device. These connections enable data transfer between the memory card and host device. An interface may be defined by a standard that enables a memory card to be coupled to any host that complies with the same standard.

BRIEF DESCRIPTION OF THE DRAWINGS

FIG. 1A is a block diagram of one embodiment of a memory device connected to a host.

FIGS. 6A-C illustrate an example of pads of a memory card operable with microSD, PCIe and UFS host interfaces.

FIG. 8 illustrates another example of pads of a memory card operable with microSD, PCIe and UFS host interfaces.

FIG. 12 illustrates circuits connected to pads of a memory card.

DETAILED DESCRIPTION

Figure 1:
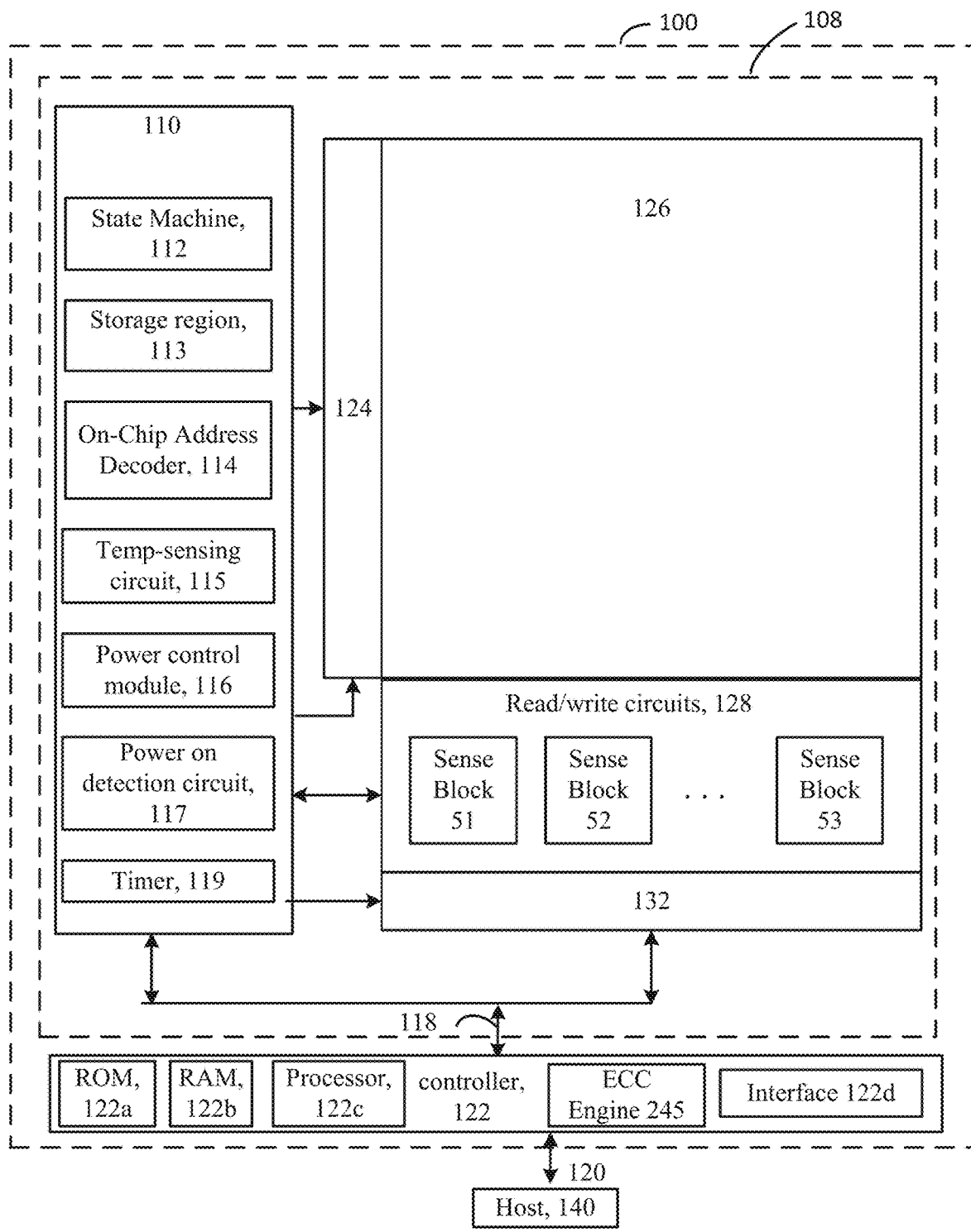
FIG. 1 is a block diagram of an example memory device comprising non-volatile memory cells in blocks.

Memory cards are generally designed to interface with a host according to an interface standard. When a memory card conforming to an interface standard is inserted in a host slot conforming to the same interface standard, host contacts align with and make physical and electrical contact with pads on a surface of the memory card thereby enabling communication (host contacts in the slot are arranged in a configuration that aligns with corresponding pads of the memory card). In general, memory cards that conform to a given interface standard are not compatible with host slots that conform to a different interface standard (although some interface standards may provide backward compatibility with earlier versions). In some cases, cards cannot physically be inserted into slots of a different standard. Even when such cards can be physically inserted, different configurations of memory card pads and host contacts mean that pads do not generally align with host contacts as required for communication (e.g., a memory card has a pattern of pads and if the host slot has a different pattern of host contacts then these two patterns do not align).

Examples of an interface standards include the Secure Digital (SD) standard and microSD standard. Another example is the microSD express standard, which is backward compatible with the older microSD standard (legacy microSD) and adds Peripheral Component Interface express (PCIe) capability. A memory card according to the microSD express standard has legacy microSD pads for backward compatibility and has PCIe pads for high-speed communication using the PCIe protocol. Another memory example is the Universal Flash Storage (UFS) interface standard. A microSD express memory card has a similar form factor to a UFS memory card and both memory cards may be physically inserted in the same host slot. However, when a memory card having pads configured according to an interface standard (e.g., microSD and PCIe pads of microSD express) is inserted in a slot having host contacts configured according to another interface standard (e.g., UFS), pads do not generally align with host contacts according to either standard, and communication is not enabled.

To overcome the above-described issues, a memory card is that includes pads arranged to make contact with host contacts in different configurations conforming to two or more different interface standards. Common pads on a memory card may extend so that a common pad can physically contact a corresponding host contact of one interface standard (e.g., PCIe pads of microSD express standard) at a first location and contact a corresponding host contact of a different interface standard (e.g., UFS) at a second location. Interface standards may specify pads arranged in rows (each row extending parallel to the leading edge of the memory card) and common pads may be elongated perpendicular to such rows to overlap different rows (e.g., to overlap a pad location for PCIe communication in one row and a pad location for UFS communication in another row). Appropriate control circuits may be connected to such common pads to detect which type of host interface is required (e.g., detect what interface standard is used by the host) and to configure interface circuits according to the required interface standard. Such a memory card may then be inserted in host slots conforming to different interface standards (e.g., legacy microSD, microSD express, and UFS) and pads, including common pads, may make contact with corresponding host contacts. Circuits in the memory card may detect the type of interface of the host (e.g., whether it is microSD, PCIe, or UFS) from voltages or currents at one or more pads. Interface circuits may be configured appropriately for the interface standard of the host and communication is enabled. A single memory card may be operable in hosts using different interface standards reducing the need for different memory cards for different devices and/or adapters to adapt between memory cards and hosts. For example, a single memory card may be operable with a host having a microSD interface, a microSD express (PCIe) interface, or a UFS interface.

FIG. 1 is a block diagram of an example memory device that may be implemented as a memory card. The memory device 100, such as a non-volatile data storage system or data storage device (DSD, e.g., hard disk drive (HDD), solid state drive (SSD), tape drive, hybrid drive, etc.), may include one or more memory die 108. The memory die 108 includes a memory structure 126 of memory cells, such as an array of memory cells, control circuit 110, and read/write circuits 128. The memory structure 126 is addressable by word lines via a row decoder 124 and by bit lines via a column decoder 132.

The read/write circuits 128 include multiple sense blocks 51, 52, . . . 53 (sensing circuit) and enable a page of memory cells to be read or programmed in parallel. Typically, a controller 122 is included in the same memory device 100 (e.g., a removable storage card or other non-volatile storage apparatus) as the one or more memory die 108. The controller may be separate from the memory die. Commands and data are transferred between the host 140 and controller 122 via an interface such as data bus 120, and between the controller and the one or more memory die 108 via lines 118.

The memory structure 126 can be 2D or 3D. The memory structure may comprise one or more array of memory cells including a 3D array. The memory structure may comprise a monolithic 3D memory structure in which multiple memory levels are formed above (and not in) a single substrate, such as a wafer, with no intervening substrates. The memory structure may comprise any type of non-volatile memory that is monolithically formed in one or more physical levels of arrays of memory cells having an active area disposed above a silicon substrate. The memory structure may be in a non-volatile memory device having circuitry associated with the operation of the memory cells, whether the associated circuitry is above or within the substrate.

The control circuit 110 cooperates with the read/write circuits 128 to perform memory operations on the memory structure 126 including read, write, and erase, and includes a state machine 112, an on-chip address decoder 114, a temperature-sensing circuit 115, a power control module 116, a power on detection circuit 117 and a timer 119.

The state machine 112 provides chip-level control of memory operations. A storage region 113 may be provided, e.g., for operational parameters and software/code. In one embodiment, the state machine is programmable by the software. In other embodiments, the state machine does not use software and is completely implemented in hardware (e.g., electrical circuits). The on-chip address decoder 114 provides an address interface between that used by the host or a memory controller to the hardware address used by the decoders 124 and 132. An indication of temperature which is obtained by the temperature-sensing circuit 115 may be used to adjust a read operation, as described further below.

The power control module 116 controls the power and voltages supplied to the word lines, select gate lines, bit lines and source lines during memory operations. It can include drivers for data and dummy word lines, SGS and SGD transistors and source lines. The sense blocks 51-53 can include bit line drivers, in one approach. The power on detection circuit may be used to detect when the memory device has been powered on. The detection circuit 117 may comprise an event handler which may be a software or firmware routine, or a routine implemented in hardware. The timer 119 may be used to determine a time which has elapsed since a last operation (e.g., read or write operation). The timer 119 may increment based on a clock signal used in the memory device.

In some implementations, some of the components can be combined. In various designs, one or more of the components (alone or in combination), other than memory structure 126, can be thought of as at least one control circuit which is configured to perform the techniques described herein including the steps of the processes described herein. For example, a control circuit may include any one of, or a combination of, control circuit 110, state machine 112, on-chip address decoder 114, power control module 116, sense blocks 51, 52, . . . , 53, read/write circuits 128, controller 122, and so forth.

The off-chip controller 122 (which in one embodiment is an electrical circuit) may comprise a processor 122c, storage devices (memory) such as ROM 122a and RAM 122b and an error correction code (ECC) engine 245. The ECC engine can correct a number of read errors.

A host interface 122d is also provided. The host interface 122d, in communication with ROM 122a, RAM 122b and processor 122c, is an electrical circuit that provides an electrical interface between controller 122 and host 140 through data bus 120. For example, the host interface can change the format or timing of signals, provide a buffer, isolate from surges, latch I/O and so forth. Host interface 122d may be configurable for different hosts in some cases and may include or be in communication with circuits that configure host interface 122d appropriately for a given host.

The memory device comprises code such as a set of instructions, and the processor is operable to execute the set of instructions to provide the functionality described herein. Alternatively, or additionally, the processor can access code from the memory structure, such as a reserved area of memory cells in one or more word lines.

For example, code can be used by the controller to access the memory structure such as for programming, read and erase operations. The code can include boot code and control code (e.g., a set of instructions). The boot code is software that initializes the controller during a booting or startup process and enables the controller to access the memory structure. The code can be used by the controller to control one or more memory structures. Upon being powered up, the processor 122c fetches the boot code from the ROM 122a or memory structure 126 for execution, and the boot code initializes the system components and loads the control code into the RAM 122b. Once the control code is loaded into the RAM, it is executed by the processor. The control code includes drivers to perform basic tasks such as controlling and allocating memory, prioritizing the processing of instructions, and controlling input and output ports.

In one embodiment, the host is a computing device (e.g., laptop, desktop, smartphone, tablet, digital camera) that includes one or more processors, one or more processor readable storage devices (RAM, ROM, flash memory, hard disk drive, solid state memory) that store processor readable code (e.g., software) for programming the one or more processors to perform the methods described herein. The host device (host) may also include additional system memory, one or more input/output interfaces and/or one or more input/output devices in communication with the one or more processors.

Other types of non-volatile memory in addition to NAND flash memory can also be used.

Semiconductor memory devices include volatile memory devices, such as dynamic random access memory ("DRAM") or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), and magnetoresistive random access memory ("MRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse or phase change material, and optionally a steering element, such as a diode or transistor. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND string is an example of a set of series-connected transistors comprising memory cells and select gate transistors.

A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are examples, and memory elements may be otherwise configured.

The semiconductor memory elements located within and/or over a substrate may be arranged in two or three dimensions, such as a 2D memory structure or a 3D memory structure. In a 2D memory structure, the semiconductor memory elements are arranged in a single plane or a single memory device level. Typically, in a 2D memory structure, memory elements are arranged in a plane (e.g., in an x-y direction plane) which extends substantially parallel to a major surface of a substrate that supports the memory elements. The substrate may be a wafer over or in which the layer of the memory elements is formed, or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and word lines.

A 3D memory array is arranged so that memory elements occupy multiple planes or multiple memory device levels, thereby forming a structure in three dimensions (i.e., in the x, y and z directions, where the z direction is substantially perpendicular, and the x and y directions are substantially parallel to the major surface of the substrate).

As a non-limiting example, a 3D memory structure may be vertically arranged as a stack of multiple 2D memory device levels. As another non-limiting example, a 3D memory array may be arranged as multiple vertical columns (e.g., columns extending substantially perpendicular to the major surface of the substrate, i.e., in the y direction) with each column having multiple memory elements. The columns may be arranged in a 2D configuration, e.g., in an x-y plane, resulting in a 3D arrangement of memory elements with elements on multiple vertically stacked memory planes. Other configurations of memory elements in three dimensions can also constitute a 3D memory array.

By way of non-limiting example, in a 3D NAND memory array, the memory elements may be coupled together to form a NAND string within a single horizontal (e.g., x-y) memory device level. Alternatively, the memory elements may be coupled together to form a vertical NAND string that traverses across multiple horizontal memory device levels. Other 3D configurations can be envisioned wherein some NAND strings contain memory elements in a single memory level while other strings contain memory elements which span through multiple memory levels. 3D memory arrays may also be designed in a NOR configuration and in a ReRAM configuration.

Typically, in a monolithic 3D memory array, one or more memory device levels are formed above a single substrate. Optionally, the monolithic 3D memory array may also have one or more memory layers at least partially within the single substrate. As a non-limiting example, the substrate may include a semiconductor such as silicon. In a monolithic 3D array, the layers constituting each memory device level of the array are typically formed on the layers of the underlying memory device levels of the array. However, layers of adjacent memory device levels of a monolithic 3D memory array may be shared or have intervening layers between memory device levels.

2D arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic 3D memory arrays. Further, multiple 2D memory arrays or 3D memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read, write, and erase operations may be located on a separate controller chip and/or on the same substrate as the memory elements.

One of skill in the art will recognize that this technology is not limited to the 2D and 3D exemplary structures described but covers all relevant memory structures within the spirit and scope of the technology as described herein and as understood by one of skill in the art.

In one embodiment, the control circuit(s) are formed on a first die, referred to as a control die, and the memory array is formed on a second die, referred to as a memory die. For example, some or all control circuits (e.g., control circuit 110, row decoder 124, column decoder 132, and read/write circuits 128) associated with a memory may be formed on the same control die. A control die may be bonded to one or more corresponding memory die to form an integrated memory assembly. The control die and the memory die may have bond pads arranged for electrical connection to each other. Bond pads of the control die and the memory die may be aligned and bonded together by any of a variety of bonding techniques, depending in part on bond pad size and bond pad spacing (i.e., bond pad pitch). In some embodiments, the bond pads are bonded directly to each other, without solder or other added material, in a so-called Cu-to-Cu bonding process. In some examples, dies are bonded in a one-to-one arrangement (e.g., one control die to one memory die). In some examples, there may be more than one control die and/or more than one memory die in an integrated memory assembly. In some embodiments, an integrated memory assembly includes a stack of multiple control die and/or multiple memory die. In some embodiments, the control die is connected to, or otherwise in communication with, a memory controller. For example, a memory controller may receive data to be programmed into a memory array. The memory controller will forward that data to the control die so that the control die can program that data into the memory array on the memory die.

While memory device 100 of FIG. 1 is one example of a non-volatile storage apparatus, other examples of non-volatile storage apparatuses may be implemented using the present technology. FIG. 1 represents controller 122 in a simple manner, omitting details for simplicity. The below example of FIGS. 1A-D provides a more detailed example of a controller and how it may connect to multiple memory dies.

FIG. 1A is a block diagram of one embodiment of a memory device 101 connected to host 140 that can implement the technology proposed herein. Memory device 101 may be considered another example of a non-volatile storage apparatus. Many different types of memory devices can be used with the technology proposed herein. One example memory device is a solid-state drive ("SSD"); another is a memory card; however, other types of memory devices can also be used. Memory device 101 comprises a controller 102, non-volatile memory 104 for storing data, and local memory 106 (e.g., DRAM. SRAM or ReRAM). In one embodiment, controller 102 comprises a Front-End Processor (FEP) circuit 141 and one or more Back End Processor (BEP) circuits 142. In one embodiment FEP circuit 141 is implemented on an ASIC. In one embodiment, each BEP circuit 142 is implemented on a separate ASIC. In one embodiment, the ASICs for each of the BEP circuits 142 and the FEP circuit 141 are implemented on the same semiconductor such that the controller 102 is manufactured as a System on a Chip ("SoC"). FEP circuit 141 and BEP circuit 142 both include their own processors. In one embodiment, FEP circuit 141 and BEP circuit 142 work as a master slave configuration where the FEP circuit 141 is the master and each BEP circuit 142 is a slave. For example, FEP circuit 141 implements a flash translation layer that performs memory management (e.g., garbage collection, wear leveling, etc.), logical to physical address translation, communication with the host, management of DRAM (local volatile memory) and management of the overall operation of the SSD (or other non-volatile storage system). BEP circuit 142 manages memory operations in the memory packages/die at the request of FEP circuit 141. For example, the BEP circuit 142 can carry out the read, erase and programming processes. Additionally, the BEP circuit 142 can perform buffer management, set specific voltage levels required by the FEP circuit 141, perform error correction (e.g., generate error correction code (ECC)), control the Toggle Mode interfaces to the memory packages, etc. In one embodiment, each BEP circuit 142 is responsible for its own set of memory packages. Controller 102 is one example of a control circuit.

In one embodiment, non-volatile memory 104 comprises a plurality of memory packages. Each memory package includes one or more memory die. Therefore, controller 102 is connected to one or more non-volatile memory die. In one embodiment, each memory die in the memory packages 104 utilize NAND flash memory (including two-dimensional NAND flash memory and/or three-dimensional NAND flash memory). In other embodiments, the memory package can include other types of memory.

Controller 102 communicates with host 140 via an interface (e.g., a data bus 120). In one embodiment, data bus 120 implements a Universal Flash Storage ("UFS") interface. In an embodiment, data bus 120 implements a Secure Digital ("SD") interface. In an embodiment, data bus 120 implements a Peripheral Component Interface express (PCIe) interface. Embodiments include memory devices, including memory cards, that are configured to implement two, three, or more such interfaces to communicate with different hosts.

Host 140 is configured to run a software application 143 that needs to access (e.g., write to and read from) memory device 101. To access memory device 101, application 143 communicates with driver 144, which is software for enabling communication between application 143 and memory device 101. The software implementing driver 144 can be executed by a microprocessor in host 140. Driver 144 is in communication with a host controller 146 (e.g., a microprocessor and software, or other type of processor) that communicates with memory device 101 via device interface 129. In one embodiment, device interface 129 includes a series of connectors, ports capacitors, etc. for physically connecting to memory device 101. Host controller 146 is also connected to host memory 130, which is the host's physical memory and can be DRAM, SRAM, non-volatile memory, or another type of storage. Host 140 is external to and separate from memory device 101. In one embodiment, memory device 101 is embedded in host 140. In some embodiments, memory device 101 is not embedded in host 140, but is connected to host 140.

Host 140 is one example of an entity that is external to memory device 101. Other examples of an entity that is external to memory device 101 include other computing devices (e.g., computers, servers, smart appliances, smart phones, cameras etc.) that are connected to memory device 101 and other computing systems that are in communication with memory device 101 via any communication means (e.g., LAN, WAN, WiFi, wired connection, wireless connection, direct connection, indirect connection, etc.)

Figure 1B:
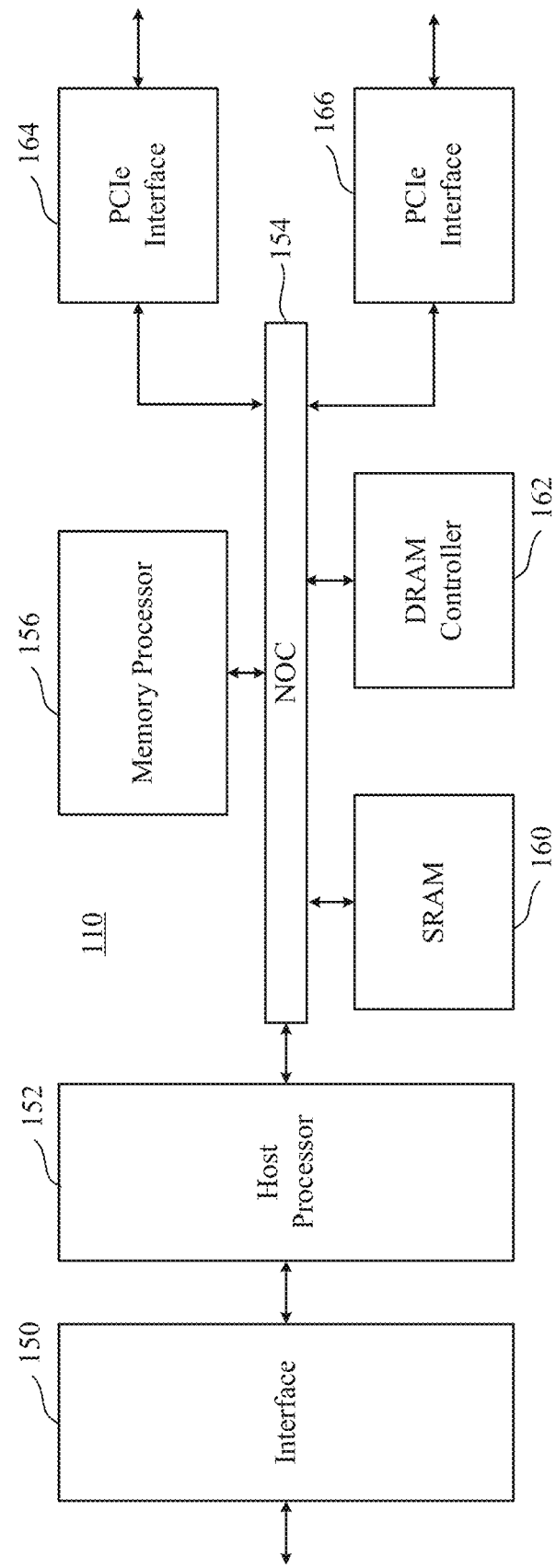
FIG. 1B is a block diagram of one embodiment of a Front-End Processor Circuit. In some embodiments, the Front-End Processor Circuit is part of a controller.

FIG. 1B is a block diagram of one embodiment of FEP circuit 141. FIG. 1B shows an interface 150 to communicate with host 140 and a host processor 152 in communication with interface 150. Interface 150 may be configured for communication according to an interface protocol such as microSD, PCIe (e.g., in an interface according to the microSD express standard), or UFS. The host processor 152 can be any type of processor known in the art that is suitable for the implementation. Host processor 152 is in communication with a network-on-chip (NOC) 154. A NOC is a communication subsystem on an integrated circuit, typically between cores in a System on Chip (SoC). NOCs can span synchronous and asynchronous clock domains or use unclocked asynchronous logic. NOC technology applies networking theory and methods to on-chip communications and brings notable improvements over conventional bus and crossbar interconnections. NOC improves the scalability of SoCs and the power efficiency of complex SoCs compared to other designs. The wires and the links of the NOC are shared by many signals. A high level of parallelism is achieved because all links in the NOC can operate simultaneously on different data packets. Therefore, as the complexity of integrated subsystems keep growing, a NOC provides enhanced performance (such as throughput) and scalability in comparison with previous communication architectures (e.g., dedicated point-to-point signal wires, shared buses, or segmented buses with bridges). Connected to and in communication with NOC 154 is memory processor 156, SRAM 160 and DRAM controller 162. The DRAM controller 162 is used to operate and communicate with the DRAM (e.g., local memory 106). SRAM 160 is local RAM memory used by memory processor 156. Memory processor 156 is used to run the FEP circuit and perform the various memory operations. Also, in communication with the NOC are two PCIe Interfaces 164 and 166. In the embodiment of FIG. 1B, the SSD controller will include two BEP circuits 142; therefore, there are two PCIe Interfaces 164/166. Each PCIe Interface communicates with one of the BEP circuits 142. In other embodiments, there can be more or less than two BEP circuits 142; therefore, there can be more than two PCIe Interfaces.

Figure 1C:
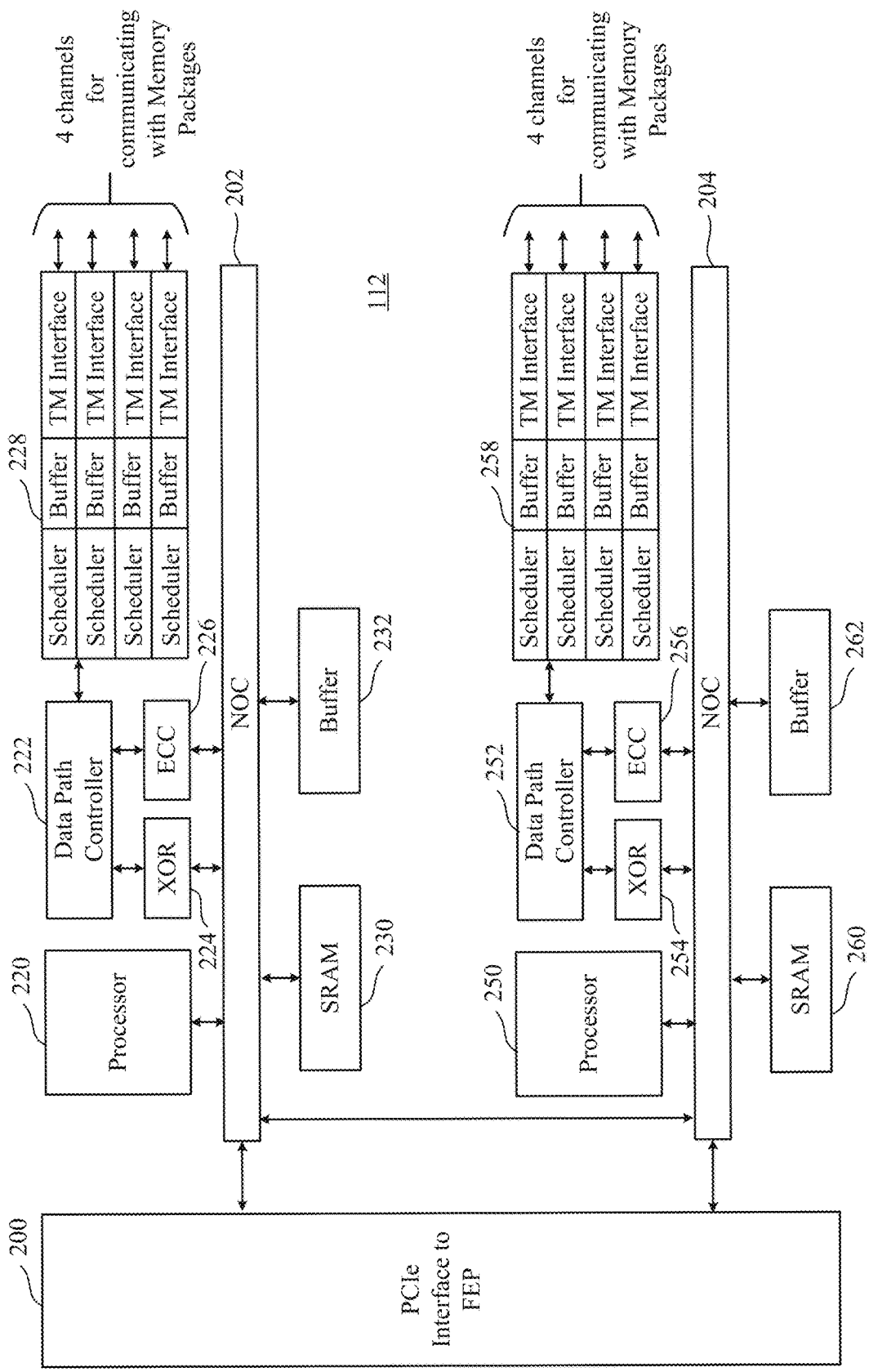
FIG. 1C is a block diagram of one embodiment of a Back End Processor Circuit. In some embodiments, the Back End Processor Circuit is part of a controller.

FIG. 1C is a block diagram of one embodiment of the BEP circuit 142. FIG. 1C shows a PCIe Interface 200 for communicating with the FEP circuit 141 (e.g., communicating with one of PCIe Interfaces 164 and 166 of FIG. 2). PCIe Interface 200 is in communication with two NOCs 202 and 204. In one embodiment the two NOCs can be combined to one large NOC. Each NOC (202/204) is connected to SRAM (230/260), a buffer (232/262), processor (220/250), and a data path controller (222/252) via an XOR engine (224/254) and an ECC engine (226/256). The ECC engines 226/256 are used to perform error correction, as known in the art (e.g., encoding data to be written and decoding data that is read). The XOR engines 224/254 are used to XOR the data so that data can be combined (e.g., combine data) and stored in a manner that can be recovered in case there is a programming error. Data path controller 22 is connected to an interface module for communicating via four channels with memory packages. Thus, the top NOC 202 is associated with an interface 228 for four channels for communicating with memory packages and the bottom NOC 204 is associated with an interface 258 for four additional channels for communicating with memory packages. Each interface 228/258 includes four Toggle Mode interfaces (TM Interface), four buffers and four schedulers. There is one scheduler, buffer, and TM Interface for each of the channels. The processor can be any standard processor known in the art. The data path controllers 222/252 can be a processor, FPGA, microprocessor, or other type of controller. The XOR engines 224/254 and ECC engines 226/256 are dedicated hardware circuits, known as hardware accelerators. In other embodiments, the XOR engines 224/254 and ECC engines 226/256 can be implemented in software. The scheduler, buffer, and TM Interfaces are hardware circuits.

Figure 1D:
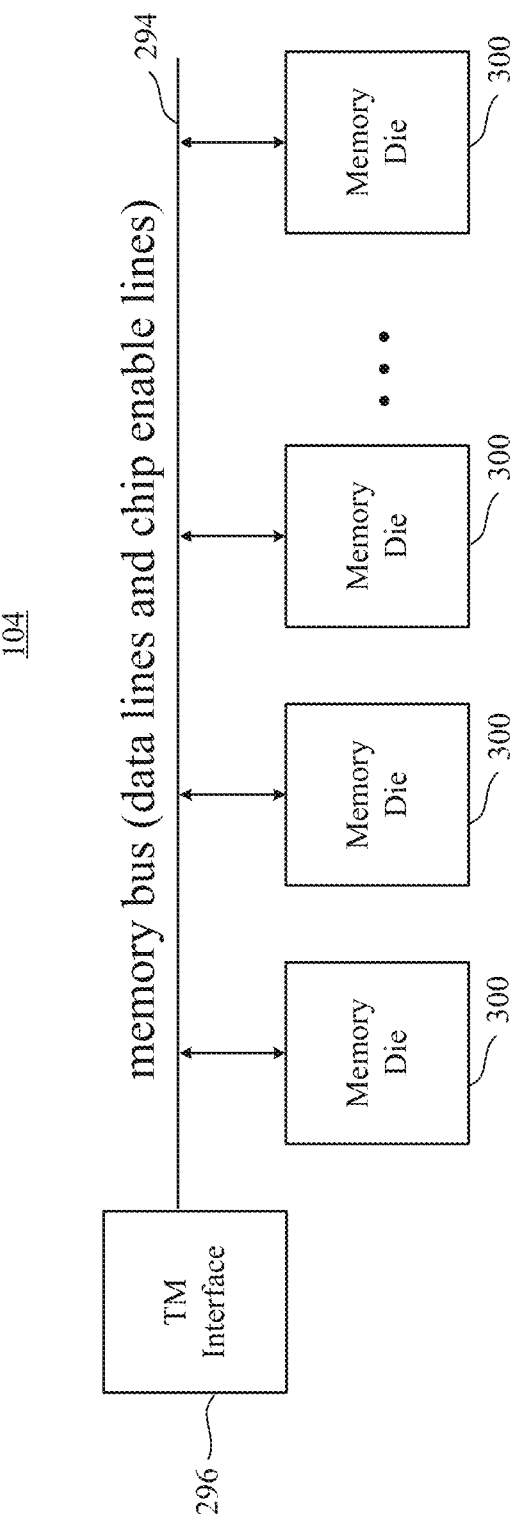
FIG. 1D is a block diagram of one embodiment of a memory package.

FIG. 1D is a block diagram of one embodiment of a memory package 104 that includes a plurality of memory die 300 connected to a memory bus 294 (command lines, data lines and chip enable lines). The memory bus 294 connects to a Toggle Mode Interface 296 for communicating with the TM Interface of a BEP circuit 142 (see e.g., FIG. 1C). In some embodiments, the memory package can include a small controller connected to the memory bus and the TM Interface. The memory package can have one or more memory die. In one embodiment, each memory package includes eight or sixteen memory die; however, other numbers of memory die can also be implemented. The technology described herein is not limited to any particular number of memory die.

FIGS. 1A-D provide one example architecture of a controller. However, the technology described herein is not limited to any specific form of the controller. Therefore, other architectures can be utilized for the controller. For example, other embodiments of a controller include microprocessors, microcontrollers, state machine, etc. in other configurations. In some cases, the controller can be inside the host. In other cases, the controller can be implemented on the memory die. Other options/configurations can also be used. A controller can also be referred to as a processor, even if it includes multiple processing cores, as the controller operates as a processor for the memory device.

Figure 2:
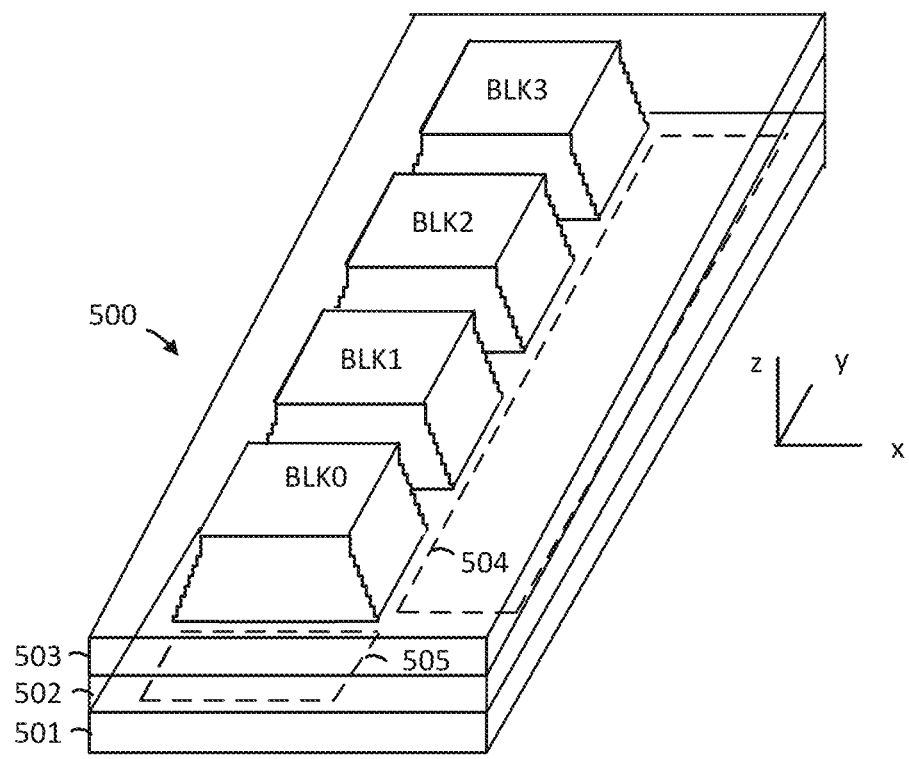
FIG. 2 is a block diagram of one embodiment of a memory die.

FIG. 2 is a perspective view of a memory device 500 comprising a set of blocks in an example 3D configuration of the memory structure 126 of FIG. 1. On the substrate are example blocks BLK0, BLK1, BLK2 and BLK3 of memory cells (storage elements) and peripheral areas with circuitry for use by the blocks. The peripheral area 504 runs along an edge of each block while the peripheral area 505 is at an end of the set of blocks. The substrate 501 can also carry circuitry under the blocks, and one or more lower metal layers which are patterned in conductive paths to carry signals of the circuitry. The blocks are formed in an intermediate region 502 of the memory device. In an upper region 503 of the memory device, one or more upper metal layers are patterned in conductive paths to carry signals of the circuitry.

Figure 3:
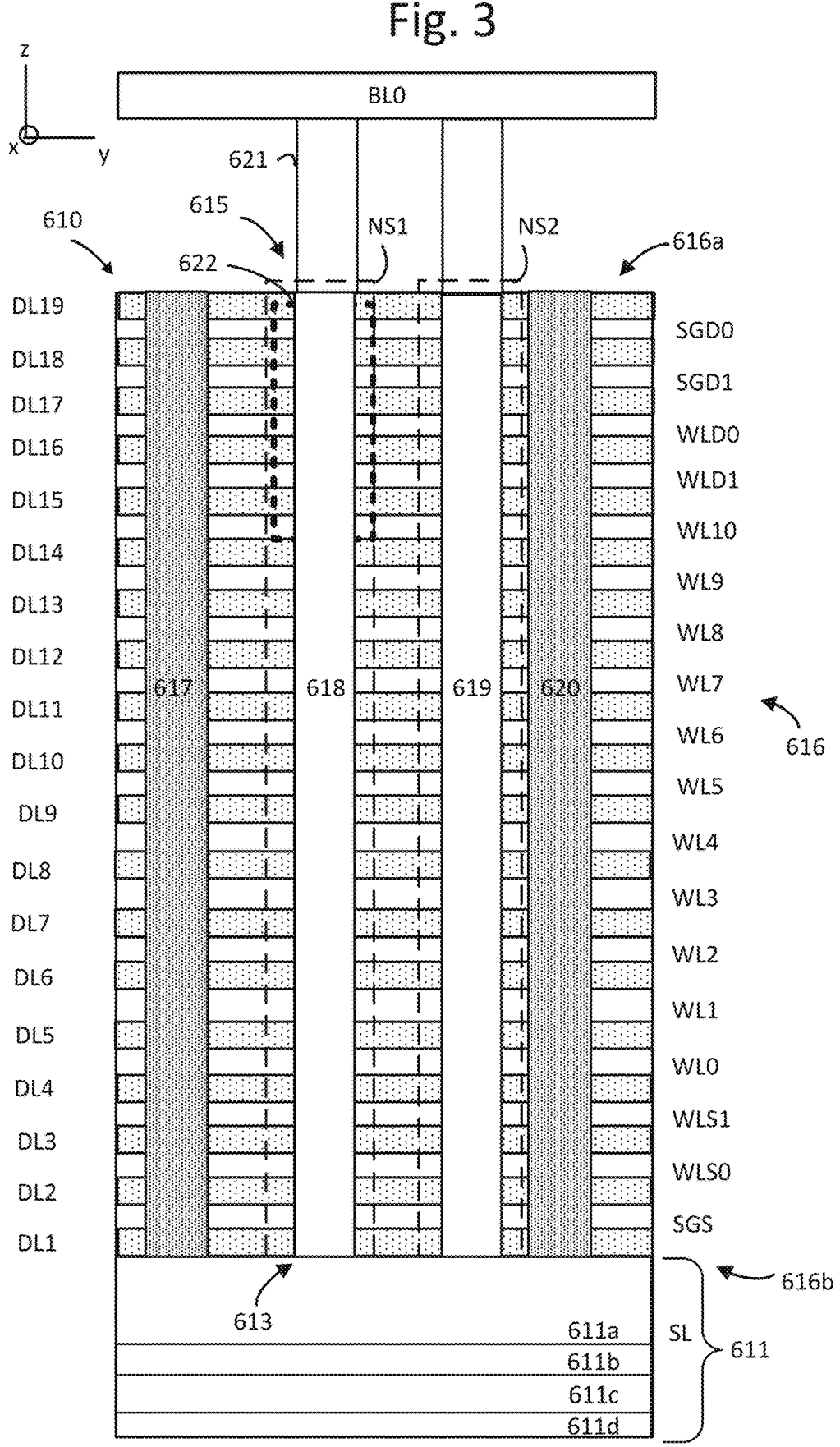
FIG. 3 shows an example of an example of a 3D memory structure.

FIG. 3 depicts an example cross-sectional view of a portion of one of the blocks of FIG. 2. The block comprises a stack 610 of alternating conductive and dielectric layers. In this example, the conductive layers comprise two SGD layers, one SGS layer, two source-side dummy word line layers (or word lines) WLS1 and WLS0, two drain-side dummy word line layers WLD1 and WLD0, and eleven data word line layers (or data word lines) WL0-WL10. WL0 is a source-side data word line and WLS1 is a dummy word line layer which is adjacent to the source-side data word line. WLS0 is another dummy word line layer which is adjacent to WLS1. WL10 is a drain-side data word line and WLD1 is a dummy word line layer which is adjacent to the drain-side data word line. WLD0 is another dummy word line layer which is adjacent to WLD1. The dielectric layers are labelled as DL1-DL19. Further, regions of the stack which comprise NAND strings NS1 and NS2 are depicted. Each NAND string encompasses a memory hole 618 or 619 which is filled with materials which form memory cells adjacent to the word lines.

The stack includes a substrate 611. In one approach, a portion of the source line SL comprises an n-type source diffusion layer 611a in the substrate which is in contact with a source end of each string of memory cells in a block. An erase voltage may be applied to this layer in an erase operation. The n-type source diffusion layer 611a is formed in a p-type well region 611b, which in turn is formed in an n-type well region 611c, which in turn is formed in a p-type semiconductor substrate 611d, in one possible implementation. The n-type source diffusion layer may be shared by all of the blocks in a plane, in one approach.

NS1 has a source-end 613 at a bottom 616b of the stack 616 and a drain-end 615 at a top 616a of the stack. Metal-filled slits 617 and 620 may be provided periodically across the stack as interconnects which extend through the stack, such as to connect the source line to a line above the stack. The slits may be used during the formation of the word lines and subsequently filled with metal. A portion of a bit line BL0 is also depicted. A conductive via 621 connects the drain-end 615 to BL0.

In some examples, a memory device such as memory device 100 or memory device 101 may be in the form of a memory card that is removably connected to a host instead of being permanently connected. This may enable the same memory device to be used with different hosts so that the same memory card may be usable in a camera, phone, music device, laptop, or other host at different times and the same host may use different memory devices at different times. Various host interface standards exist to enable such interchangeability of memory cards and hosts.

A memory card may be inserted in a slot provided in a host so that contacts on the host side align and engage with pads on the memory card side and electrical connection is established between host contacts and corresponding pads of the memory card. A memory card interface standard may establish locations of host contacts and corresponding locations of memory card pads along with physical dimensions of host slots and memory cards (form factor of card) in addition to communication protocols and other aspects of the interface.

Many memory cards are designed according to a memory card standard so that they are operable with only hosts that have corresponding memory card slots. Some memory cards are designed to operate with more than one version of a host interface standard so that, for example, newer cards that support newer host interface standards may also support older host interface standards for backward compatibility. Such memory cards may have the same form factor to enable insertion in hosts supporting older or newer host interface standards. Thus, some host interface standards incorporate prior host interface standards for backward compatibility.

Figure 4:
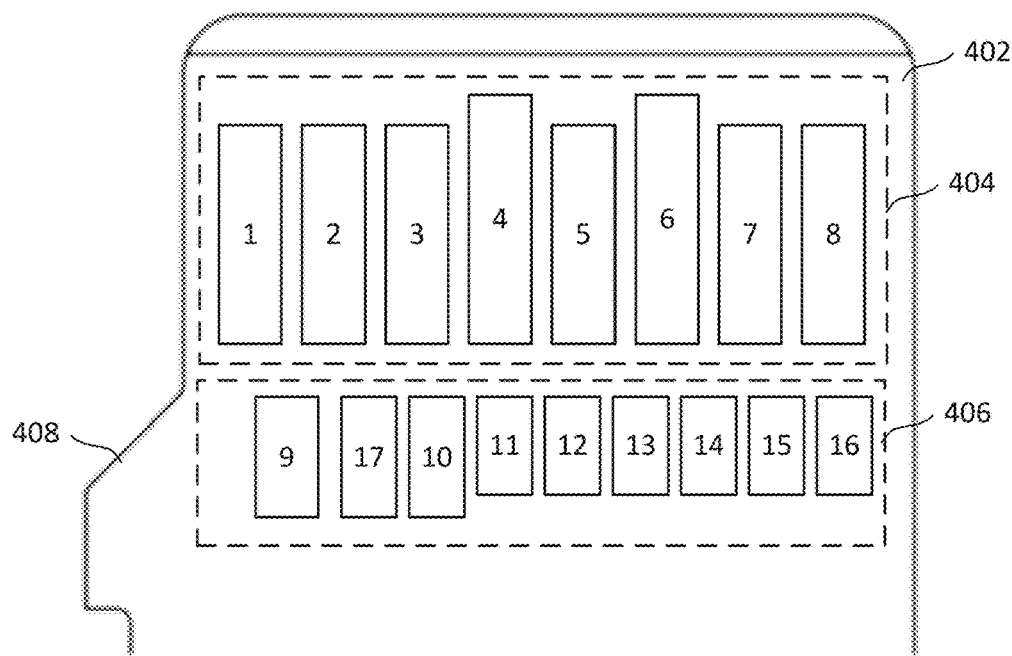
FIG. 4 shows an example of a microSD express memory card.

FIG. 4 shows an example of a microSD (OD) express memory card 402 that includes a first row of pads 404 (pads 1-8) that are located to connect with host contacts arranged in a microSD configuration (such legacy microSD hosts have a slot with host contacts arranged in a single corresponding row). Row 404 includes a set of pads located to connect with corresponding host contacts arranged in a configuration for communication according to a Secure Digital (SD) standard (host contact pads arranged in a single row). In addition to first row 404, memory card 402 includes second row 406 (pads 9-17) located to connect with host contacts arranged in another configuration to support high-speed communication using a high-speed interface protocol (e.g., a protocol that enables faster transfer of data than SD protocol enables). Second row 406 is a greater distance from the leading edge (at top of FIG. 4) of memory card 402 than first row 404 to connect with a corresponding row of host contacts in a slot that is configured for high-speed communication. A memory card conforming to the microSD express interface standard such as memory card 402 is compatible with legacy microSD hosts that only have host contacts corresponding to first row 404 and is also compatible with μSD express hosts that have host contacts corresponding to second row of pads 406 to enable high-speed communication according to the PCIe protocol. Table 1 shows assignment of the pads of memory card 402 according to the microSD express standard including legacy microSD pads and PCIe pads.

TABLE 1

| Pad Number | Name | microSD express | |
|---|---|---|---|
| | | Type | Description |
| 1 | DAT2/CLKREQ# | I/O | Data Line [Bit 2]/Reference Clock Request signal indication to host and also used by L1 PM sub-states |
| 2 | CD/DAT3/PERST# | I/O | Card Detect/Data Line [Bit 3]/Power enable Reset is a functional reset to the card. |
| 3 | CMD | I/O | Command/Response |
| 4 | $V_{DD1}$ | S | Supply Voltage (3.3 V) |
| 5 | CLK | I | Clock |
| 6 | $V_{SS}$ | S | Supply voltage ground |
| 7 | DAT0/REFCLK+ | I/O | Data Line [Bit 0]/PCIe Ref Clock |
| 8 | DAT1/REFCLK− | I/O | Data Line [Bit 1]/PCIe Ref Clock |
| 9 | $V_{DD2}$ | S | Supply voltage (1.8 V) |
| 10 | $V_{SS}$ | S | Supply voltage ground |
| 11 | PCIe TX+ | I | PCIe Transmit lane (Host to Card) |
| 12 | PCIe TX− | I | PCIe Transmit lane (Host to Card) |
| 13 | $V_{SS}$ | S | Supply voltage ground |
| 14 | PCIe RX− | O | PCIe Receive lane (Card to Host) |
| 15 | PCIe RX+ | O | PCIe Receive lane (Card to Host) |
| 16 | VSS | S | Supply voltage ground |
| 17 | $V_{DD3}$ | S | Supply voltage (1.2 V) |

It can be seen that certain pads in row 404 are used for both microSD communication and for high-speed communication (in this case using PCIe as a high-speed interface protocol). For example, pads 7 and 8 are used for data (bits 0 and 1 respectively) when communicating using the microSD protocol and are used for reference clock signals when communicating using the PCIe protocol. Pads of row 406 in combination with such pads of row 404 form a set of pads located to connect with corresponding PCIe host contacts of a microSD express host that are arranged for communication according to the PCIe protocol.

Figure 5:
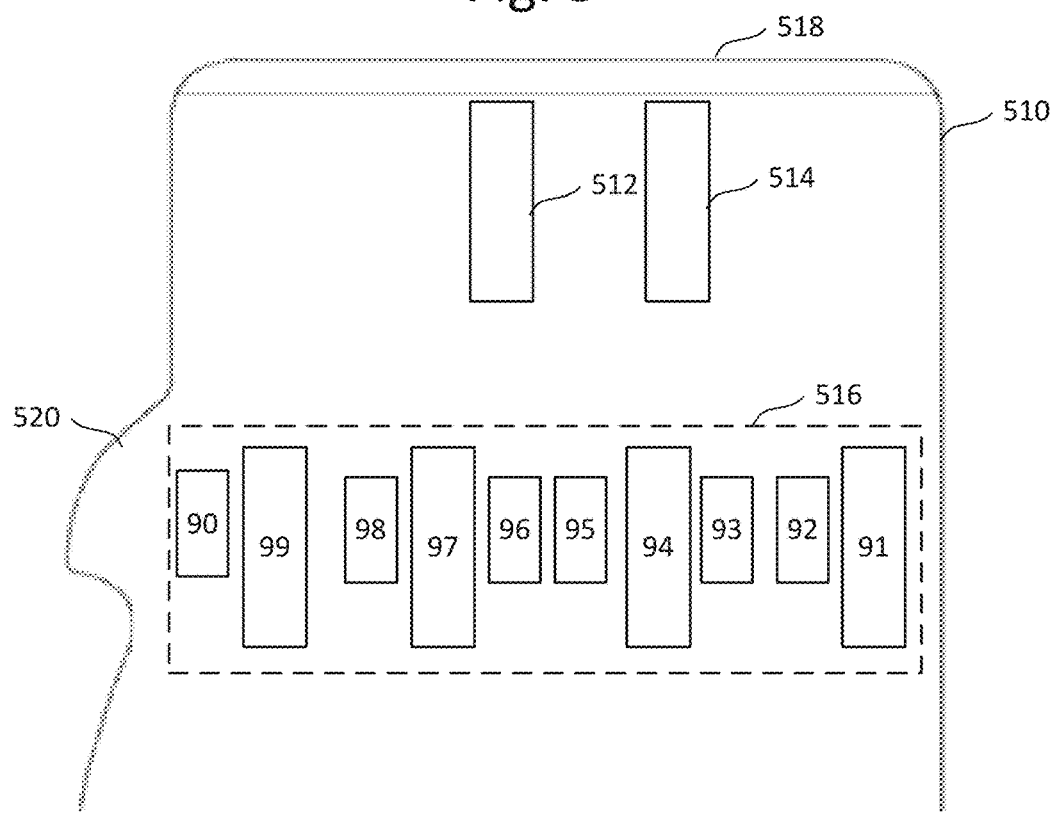
FIG. 5 shows an example of a UFS memory card.

FIG. 5 shows another example of a memory card, UFS memory card 510, with locations of pads for communication with a host. UFS memory card 510 includes pad 512, which is for receiving a supply voltage of 3.3V and pad 514, which is for receiving a supply voltage at ground. A row 516 extends across memory card 510 below pads 512 and 514 (at a greater distance from the leading edge 518 of memory card 510 than pads 512 and 514). Pads of row 516 are numbered from 90 to 99 and the assignment of pads is given in table 2 below (note that pads 91 and 92 of the UFS scheme correspond to pads 514 and 512 and are not included in table 2.

TABLE 2

| UFS Card Edge pin# | Signal | UFS |
|---|---|---|
| 91 | VSS | Ground |
| 92 | DIN_C | DIN_c SMP connector |
| 93 | DIN_T | DIN_t SMP connector |
| 94 | VSS | Ground |
| 95 | DOUT_ C | DOUT_c SMP connector |
| 96 | DOUT_T | DOUT_T SMP connector |
| 97 | VSS | Ground |
| 98 | REF_CLK | REF_CLK SMP connector |
| 99 | VCCQ2 | 1.8 V |
| 90 | C/D (GND) | C/D header |

The form factor of memory card 510 is not identical to the form factor of memory card 402. For example, memory card 510 includes edge feature 520, which is different to corresponding edge feature 408 of memory card 402. In some cases, a slot may be able to accommodate memory cards having both microSD and UFS form factors.

In general, a memory card that is designed for a given interface standard is only compatible with hosts that are configured according to the same standard, with some cards being backward compatible with an earlier standard (e.g., microSD express is backward compatible with legacy microSD). This requires consumers to choose the right memory card format that is compatible with their device or devices (e.g., choose between microSD express or UFS). In some cases, a consumer who owns multiple devices may have memory cards for one device that are not compatible with another device (e.g., microSD express memory card from a camera will not work in a phone or laptop that has only a UFS slot) or may require an adaptor.

Aspects of the present technology provide a memory card that is configured to be operable with multiple host interface standards so that the same memory card may be used with hosts designed for different host interface standards (e.g., microSD express and UFS hosts). This may allow a consumer to use the same card with a wider range of devices without using an adaptor.

FIG. 6A illustrates an arrangement of pads of a memory card that is compatible microSD express (legacy microSD and PCIe) and UFS hosts. A first row 404 includes legacy microSD pads as previously described with respect to FIG. 4 and table 1 for contact with corresponding microSD host contacts. A second row of pads 630 generally corresponds to second row 406 for high-speed communication (e.g., PCIe communication with PCIe host contacts of a microSD express slot) and a third row 632 generally corresponds to row 516 of FIG. 5 for UFS communication. Pads are numbered according to respective schemes (i.e., microSD express pads are numbered as illustrated in FIG. 4 and table 1 while UFS pads are generally numbered as illustrated in FIG. 5 and table 2).

Extending between second row 630 and third row 632 are common pads that are elongated along the y direction (perpendicular to the row direction) so that they make contact with host contacts of both microSD express slots and UFS slots (at different locations). For example, common pads 624, 626, 628 and 629 extend through rows 630 and 632 so that they each align with a corresponding microSD express contact when inserted in a microSD express slot (at location of row 630) and align with a corresponding UFS host contact when inserted in a UFS slot (at location of row 632). The assignment of pads of FIG. 6A is indicated in Table 3 with shaded rows indicating common pads 624, 626, 628, and 630.

TABLE 3

| Micro SDE Pin # | SD | PCIe | UFS Pin# | UFS |
|---|---|---|---|---|
| 1 | DAT2 | CLKREQ# | — | — |
| 2 | CD/DAT3 | PERST# | — | — |
| 3 | CMD | — | — | — |
| 4 | VDD | VDD1 | — | VCC |
| 5 | CLK | — | — | — |
| 6 | VSS | VSS | — | VSS |
| 7 | DAT0 | REFCLK+ | — | — |
| 8 | DAT1 | REFCLK- | — | — |
| 9 | — | VDD2 | 99 | VCCQ2 |
| 10 | — | VSS | 97 | VSS |
| 11 | — | PCIe TX+ | 96 | DOUT_T |
| 12 | — | PCIe TX- | 95 | DOUT_C |
| 13 | — | VSS | 94 | VSS |
| 14 | — | PCIe RX- | 93 | DOUT_T |
| 15 | — | PCIe RX+ | 92 | DOUT_C |
| 16 | — | VSS | 91 | VSS |
| 17 | — | VDD3 | 98 | REFCLK |
| — | — | — | 90 | C/D |

FIG. 6A and Table 3 illustrate pads including a first set of pads along row 404 located to connect with host contacts arranged according to a legacy microSD configuration for communication according to the microSD standard. A second set of pads (along rows 404 and 630) is located to connect with host contacts arranged according to the microSD express configuration for communication according to the PCIe standard (e.g., as shown in FIG. 4). Some pads of row 404 belong to both the first and second sets (pads used for both legacy microSD and PCIe communication such as pads 1, 2, 4, and 6-8) while some are dedicated legacy microSD pads that are not used for PCIe communication (e.g., pads 3 and 5). Some pads of second row 630 (e.g., pads 17, 11, 12, 14, and 15) are dedicated PCIe pads. A third set of pads is located to connect with host contacts arranged according to a UFS configuration for communication according to the UFS standard. The third set of pads includes pads 4 and 6 of row 404 (corresponding to UFS pads 512 and 514 of FIG. 5), pads of third row 632 and common pads 624, 626, 628, and 629 that extend between the second row 630 and the third row 632. These common pads are common to the second set (used for PCIe communication) and the third set (used for UFS communication). Common pads 624, 626, 628, and 629 are elongated along the y-direction (perpendicular to the leading edge of the memory card) so that they align with PCIe host contacts in a microSD express configuration (along row 630) when the memory card is inserted in a microSD express slot and align with UFS host contacts in a UFS configuration (along row 632) when the memory card is inserted in a UFS slot. Locations of corresponding PCIe and UFS pads are indicated by corresponding reference numbers in common pads. For example, common pad 626 shows the location of microSD express pad 10 (and corresponding microSD host contact) of FIG. 4 along row 630 and the location of UFS pad 97 (and corresponding UFS host contact) of FIG. 5 along row 632 although these are not physically separate pads in this case. Common pads 624, 626, 628, and 629 are used to receive supply voltages (e.g., VSS or ground) from both PCIe and UFS host contacts as indicated in Table 3. In addition, third row 632 includes dedicated UFS pads (e.g., pads 90, 98, 96, 95, 93, and 92).

Because a legacy microSD host contacts along row 404, there are no legacy microSD host contacts corresponding to pads of rows 630 and 632. Thus, pads 1-8 form a first set of pads located along row 404 to connect with host contacts arranged in a corresponding first configuration for communication according to the microSD standard.

Figure 6B:
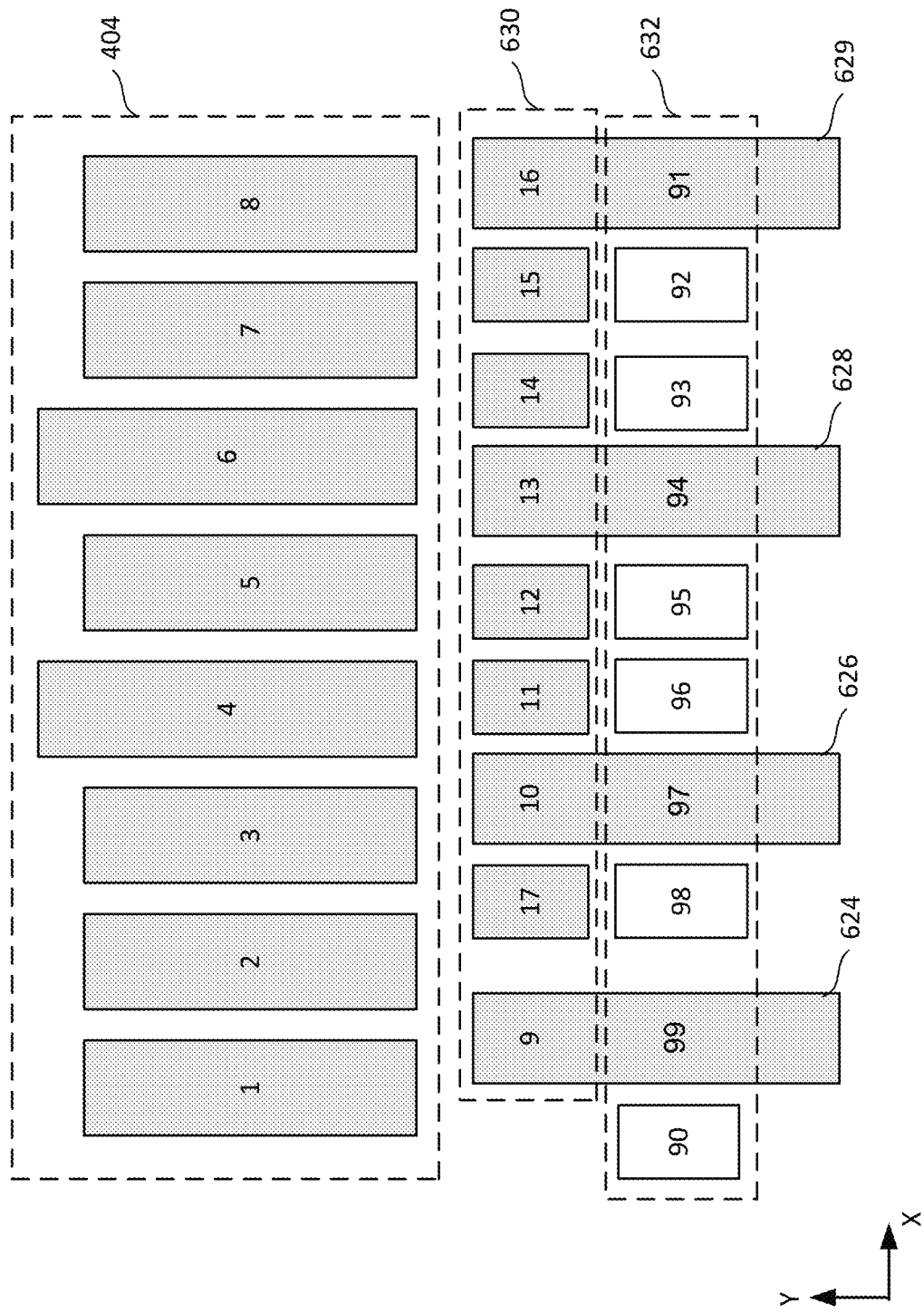

A microSD express interface for communicating according to the PCIe protocol includes pads and corresponding host contacts along rows 404 and 630 (a second set of pads located to connect with host contacts arranged in a PCIe configuration along rows 404 and 630). FIG. 6B shows the second set of pads shaded indicating which pads are contacted by corresponding host contacts when in a microSD express slot. Some microSD express pads that are used for PCIe communication may also be used for legacy microSD communication (e.g., some pads of row 404 are common to both the first set of pads used for microSD communication and the second set of pads used for PCIe communication).

A UFS interface for communicating according to the UFS standard includes pads and corresponding host contacts along row 632 in addition to pads 4 and 6 of row 404 (a third set of pads located to connect with host contacts arranged in a third configuration for communication according to the UFS standard). FIG. 6C shows the third set of pads shaded to indicate which pads are contacted by corresponding UFS host contacts when in a UFS slot. Common pads 624, 626, 628, and 629 are long enough to contact both microSD host contacts (along row 630) and UFS host contacts (along row 632) so that they are common to both the second set and the third set.

Figure 7A:
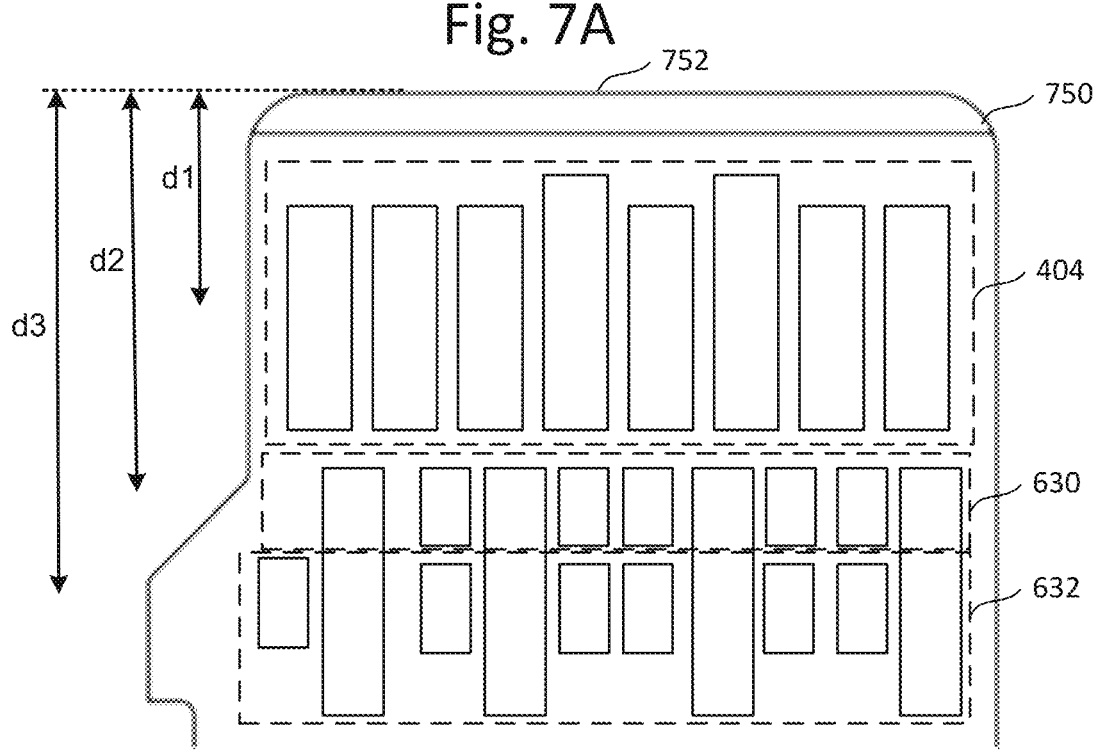
FIGS. 7A-B illustrate examples of memory cards implementing the pads of FIGS. 6A-C.

Pads arranged as illustrated in FIGS. 6A-6C may be implemented in various different memory cards so that such memory cards are operable with multiple host interfaces (e.g., operable with legacy microSD, microSD express, and UFS interfaces). Such cards may have different form factors. FIG. 7A shows rows 404, 630 and 632 of FIGS. 6A-C implemented in memory card 750, which has the form factor of a microSD express card. FIG. 7A shows row 404 a first distance d1 from leading edge 752 of memory card 750, row 630 a second distance d2 from leading edge 752, and row 632 a third distance d3 from leading edge 752 (distances d1, d2, d3 are shown to approximately mid-lines of respective rows).

Figure 7B:
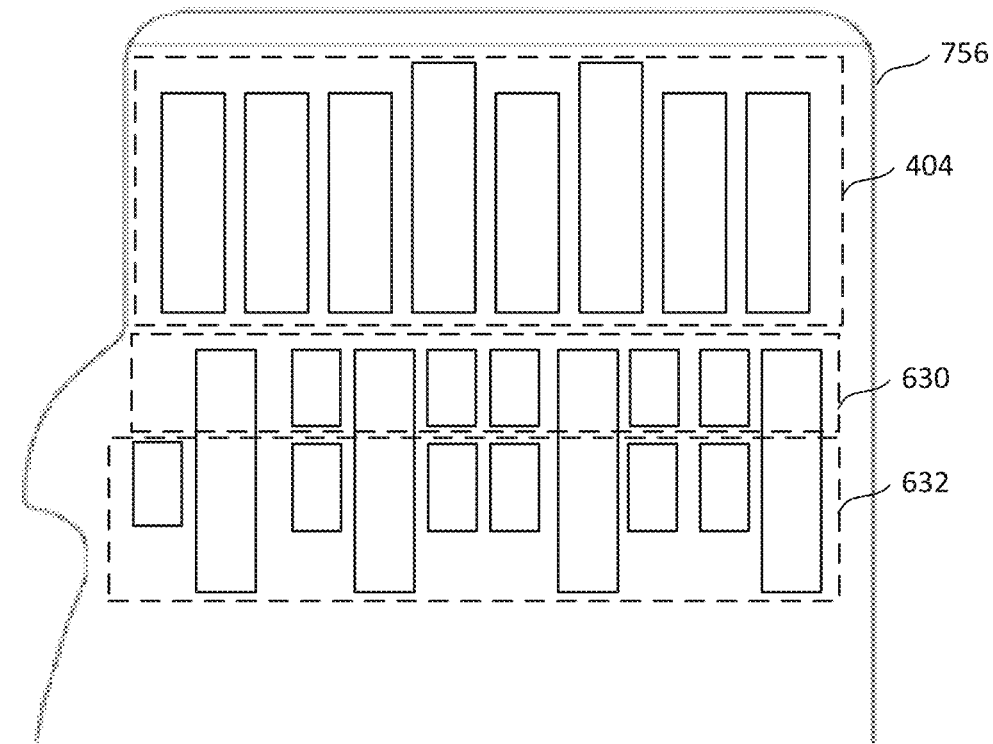

FIG. 7B illustrates an example of rows 404, 630 and 632 implemented in memory card 756, which has the form factor of a UFS card. Other form factors may also be used.

While the arrangement above includes four common pads (pads 624, 626, 628, and 629) that are common to PCIe and UFS, other arrangements may use different numbers of common pads.

FIG. 8 shows an example which includes eight common pads. In addition to common pads 624, 626, 628, and 629 (used for supply voltages), FIG. 8 shows common pads 860, 862, 864, and 866 (used for data). Table 4 illustrates an example of pad to signal mapping for the arrangement of FIG. 8 with rows corresponding to common pads shaded.

TABLE 4

| Micro SDE Pin # | SD | PCIe | UFS Pin# | UFS |
|---|---|---|---|---|
| 1 | DAT2 | CLKREQ# | — | |
| 2 | CD/DAT3 | PERST# | — | |

TABLE 4-continued

| Micro SDE Pin # | SD | PCIe | UFS Pin# | UFS |
|---|---|---|---|---|
| 3 | CMD | — | | — |
| 4 | VDD | VDD1 | | VCC |
| 5 | CLK | — | | — |
| 6 | VSS | VSS | | VSS |
| 7 | DAT0 | REFCLK+ | | |
| 8 | DAT1 | REFCLK− | | — |
| 9 | — | VDD2 | 99 | VCCQ2 |
| 10 | — | VSS | 97 | VSS |
| 11 | — | PCIe TX+ | 96 | DOUT_T |
| 12 | — | PCIe TX− | 95 | DOUT_C |
| 13 | — | VSS | 94 | VSS |
| 14 | — | PCIe RX− | 93 | DIN_T |
| 15 | — | PCIe RX+ | 92 | DIN_C |
| 16 | — | VSS | 91 | VSS |
| 17 | — | VDD3 | 98 | REFCLK |
| | | — | 90 | C/D |

While the example of FIGS. 6A-C used common pads for supply voltages (e.g., constant voltages such as VSS or ground), the example of FIG. 8 also includes pads that are configured for data communication (data pads configured to transfer data). For example, a pair of common pads 860 and 862 are used for transmitting data in both PCIe (PCIe TX+ and PCIe TX−) and UFS (DOUT T and DOUT C) using complementary signals. Similarly, another pair of common pads 864 and 866 are used for receiving data in both PCIe (PCIe RX− and PCIe RX+) and UFS (DIN_T and DIN C). These two pairs of data pads are configurable to make contact with PCIe host data contacts to operate with microSD express hosts and to make contact with UFS host data contacts to operate with UFS hosts. Circuits that are connected to such pads may be configurable according to the protocol being used so that appropriate voltages and timing are used for the different protocols.

While the example of FIG. 8 keeps microSD pad 17 and UFS pad 98 as separate pads, in another example, these pads are replaced by a common pad that extends to connect with corresponding host contacts and a circuit connected to such a common pad receives either VDD3 (PCIe) or REFCLK (UFS) depending on the host. Interface circuits may be configured for UFS communication to receive the clock signal (REFCLK) on the common pad and configured for PCIe communication to receive the power supply voltage (VDD3) on the common pad. In both FIG. 6A and FIG. 8, UFS card detect (C/D) pad 90 is exclusively UFS (it does not physically connect with any host contact of a microSD express slot). The number of common pads may be selected according to the present technology and is not limited to the examples of FIGS. 6A and 8.

Figure 9A:
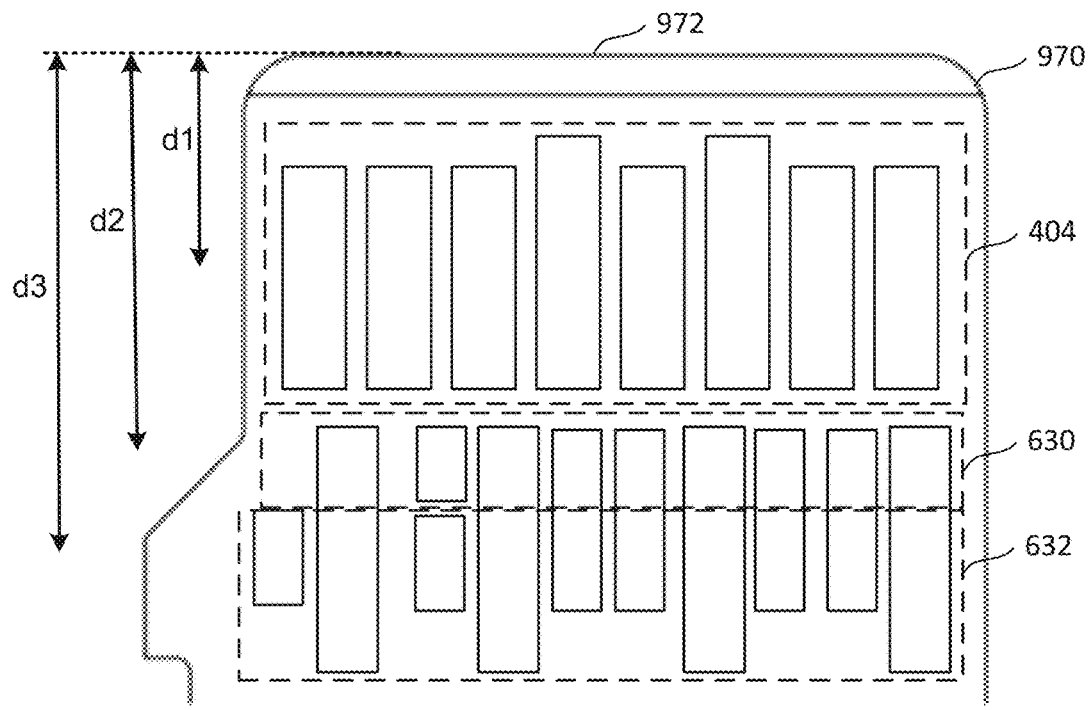
FIGS. 9A-B illustrate examples of memory cards implementing the pad arrangement of FIG. 8.
Figure 9B:
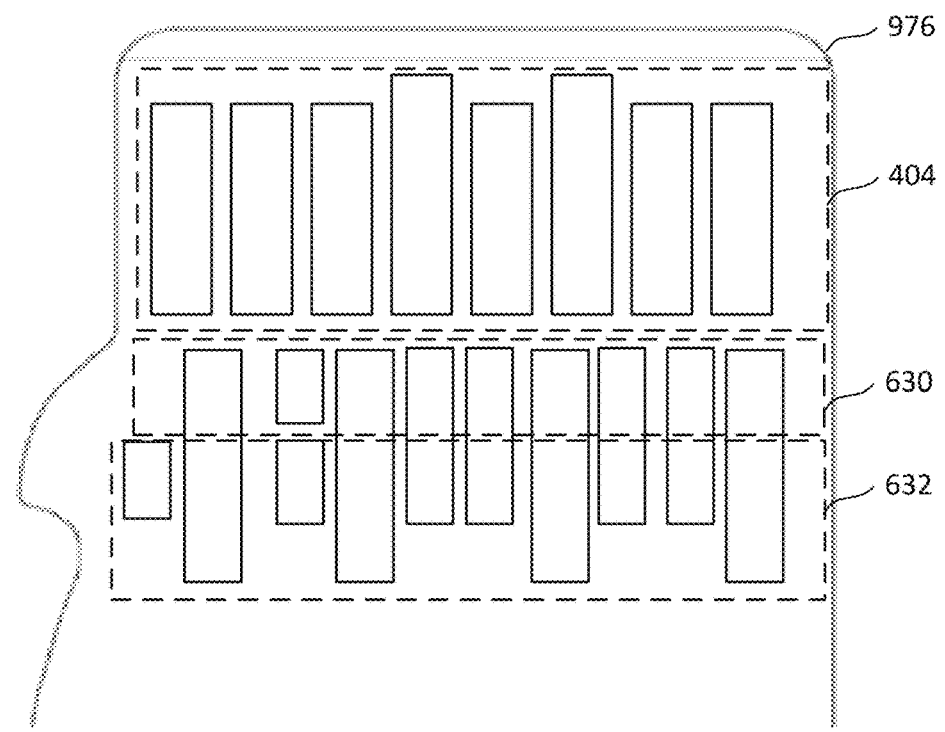

The pad arrangement of FIG. 8 may be implemented in memory cards having different form factors. FIG. 9A shows memory card 970, which has the form factor of a microSD card and has rows 404, 630, and 632 as shown in FIG. 8 at distances d1, d2, and d3 from leading edge 972 (with common pads extending between rows). FIG. 9B shows memory card 976, which has the form factor of a UFS memory card, and which implements the pad arrangement of FIG. 8 including common pads extending between rows 630 and 632.

While the above examples refer to memory cards that use PCIe as a high-speed host protocol (e.g., microSD express memory cards), some memory cards use other high-speed host protocols. The present technology enables memory cards to be operable with such high-speed protocols (e.g., a memory card using another high-speed protocol instead of PCIe may also be operable with UFS). An example of such a memory card is a microSD UHS-II card, which has the form factor of a microSD card and has two rows of pads.

Figure 10:
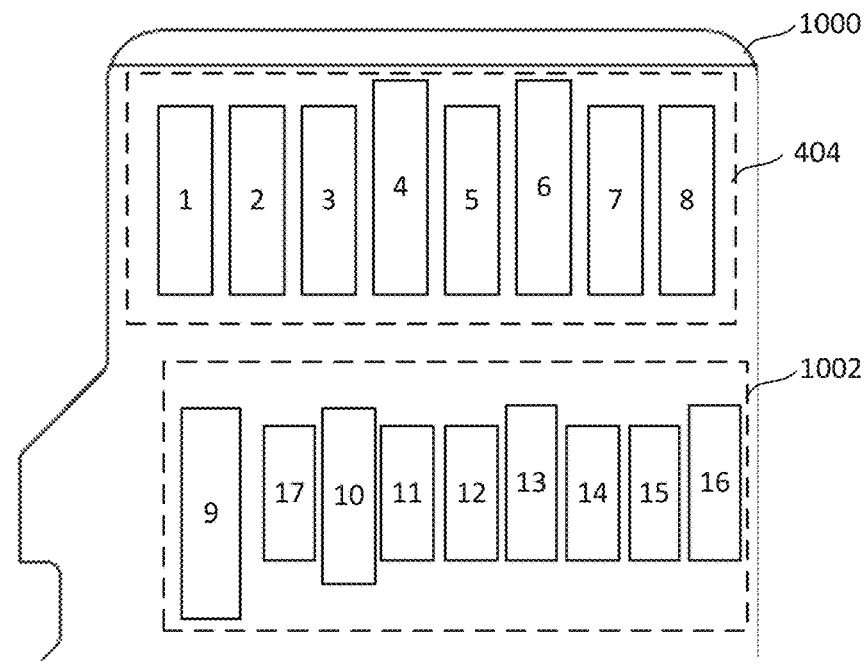
FIG. 10 illustrates an example of a microSD UHS-II memory card.

FIG. 10 shows microSD UHA-II memory card 1000, which includes two rows of pads. First row 404 consists of pads 1-8 according to the legacy microSD standard (as previously described). Second row 1002 includes pads 9-17, which have similar functions to pads 9-17 of the microSD interface (e.g., similar to Table 1) and are similarly numbered. Pads 9-17 are in different locations to pads 9-17 of a microSD express card (e.g., as shown in FIG. 4) and are generally located so that their locations overlap with locations of UFS pads making it challenging to use separate pads to make a memory card that is compatible with either a microSD UHS-II or UFS slot.

Figure 11:
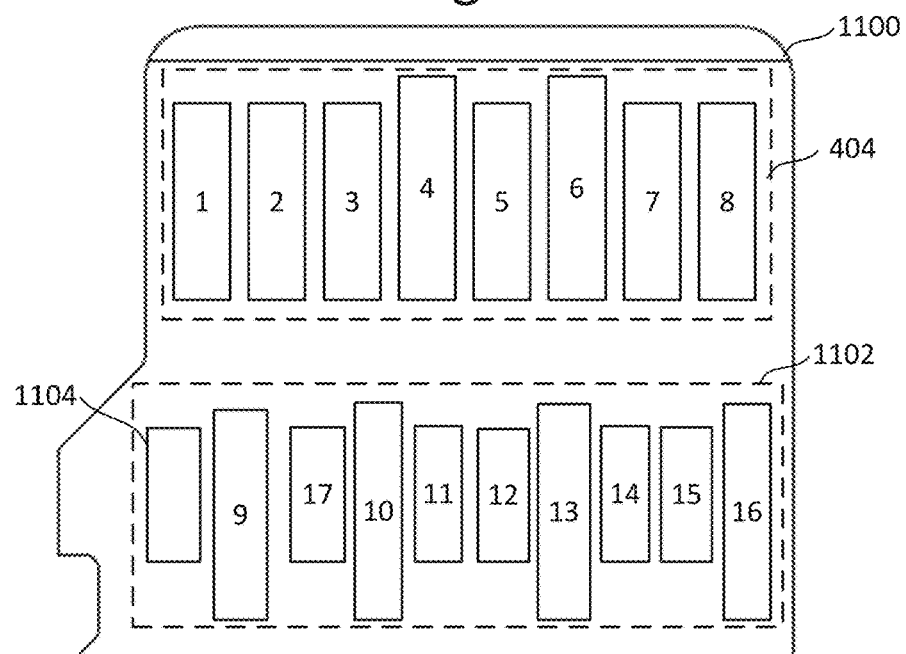
FIG. 11 illustrates an example of a memory card operable with microSD UHS-II and UFS host interfaces.

FIG. 11 shows an example of a memory card 1100 that is operable with different host interfaces including legacy microSD, microSD UHS-II, and UFS. First row 404 consists of pads 1-8 according to the legacy microSD standard. Second row 1102 includes pads numbered 9-17 as in FIG. 10 and pad 1104. Pads 9-17 are in similar locations to FIG. 10 with some elongation of certain pads (e.g., pads 10, 13, and 16) to ensure contact with host contacts of both microSD UHS-II and UFS slots. Pad 1104 is added and is a card detect (C/D) pad for connecting with a corresponding C/D host contact of a UFS slot (pad 1104 corresponds to C/D pad 90 of FIG. 5). Pad 1104 is only used for UFS and may be considered an example of a dedicated UFS pad. While the example of FIG. 11 shows memory card 1100 having the form factor of a microSD card, it may alternatively have the form factor of a UFS card.

When a memory card that is operable with different host interfaces is inserted in a slot (and pads make contact with corresponding host contacts) the memory card may perform some detection operation to determine which host interface standard is to be used (e.g., which pads are to be active and which communication protocol to use). Appropriate circuits may be provided in a memory card to perform such a detection operation (e.g., responsive to a memory card first receiving power). For example, a memory card that is operable with UFS and other standards may first determine if it is connected to a UFS interface and may configure interface circuits accordingly if it is. If it determines that it is not connected to a UFS interface, then another interface standard may be selected, which may include detecting which other standard to use (e.g., PCIe or legacy microSD).

FIG. 12 shows an example of control circuits 1220 located in a memory card (e.g., memory card 750, 756, 970, 976, 1100) and connected to pads 1222, 1223, 1224, 1225, 1226, 1227, 1228, 1229 (shown in cross section along outer surface 1230 of a memory card housing and inner surface 1231 of a host slot. Control circuits 1220 may be implemented by a controller (e.g., controller 102 or controller 122) and/or other circuits. Some of pads 1222-1229 are in physical contact with corresponding host contacts while others are not. For example, pad 1222 is in physical contact with host contact 1232, pad 1224 is in physical contact with host contact 1234, pad 1225 is in physical contact with host contact 1235, pad 1227 is in physical contact 1237, and pad 1229 is in physical contact with host contact 1239. Physical contact between pads and corresponding host contacts enables electrical connection between control circuits 1220 and host circuits so that digital data may be transferred between a host and memory card. Some pads (e.g., pads 1223, 1226, 1228) do not contact any corresponding host contact (e.g., pads for a host interface standard that is different to that of the present slot). Pads 1222-1229 include pads at different locations to enable operability with different host interfaces by connecting with host contacts in different arrangements (e.g., in UFS arrangement or microSD express arrangement). When connected to a given set of host contacts (e.g., when powered on by receiving a power supply voltage on one or more power supply pads), control circuits 1220 may determine what interface standard to use for communication with the host and may configure interface circuits accordingly.

Control circuits 1220 are connected to memory structure 1240 (e.g., memory structure 126) to enable a host to access data in memory structure 1240 (e.g., to write data in memory structure 1240 and read data in memory structure 1240). Control circuits 1220 may perform a translation function to enable different hosts using different interface standards to similarly access memory structure 1240. Communication between control circuits 1220 and memory structure 1240 may use the same standard (e.g., using a TM interface) when different host standards are used. Thus, data may be received from a first host using the UFS protocol, written in memory structure 1240, and later read and sent to a second host using microSD express protocol.

Control circuits 1220 include detection circuit 1242, which is configured to detect which type of host slot a memory card is inserted in. For example, in response to the memory card first receiving power, control circuits 1220 may detect one or more voltages and/or currents at one or more pads (e.g., pads 1222-1229) to determine the type of host slot (e.g., UFS, microSD express/PCIe, or legacy microSD). Control circuits 1220 also include interface circuit 1244 (e.g., host interface 122*d*, interface 150 and/or host processor 152), which are configurable to communicate with a host using different interface standards. Control circuits 1220 also include configuration circuit 1246, which is connected to interface circuit 1244 and can configure interface circuit 1244 to operate with a selected interface standard (e.g., may configure for UFS, PCIe or microSD). When detection circuit 1242 determines which type of host slot it is inserted in, it may indicate the type to configuration circuit 1246. Configuration circuit 1246 may then configure interface circuit 1244 according to the type so that communication with the host is enabled. For example, pad 1222 may correspond to C/D pad 90 and detection circuit 1242 may use a voltage or current at pad 1222 to determine that the memory card is inserted in a UFS slot. Configuration circuit 1246 may be considered an example of means for configuring interface circuits connected to the plurality of pads for communication according to the UFS interface standard for communication with a UFS host, for communication according to the high-speed interface protocol (e.g., PCIe or microSD UHS-II) for communication with a high-speed host, and for communication according to the microSD protocol for communication with a microSD host.

In general, the UFS interface includes a card detect (C/D) host contact and corresponding C/D pad on a UFS enabled memory card. This enables a UFS host to detect the presence of a UFS enabled memory card. A UFS enabled memory card may have its C/D pad connected to ground and a UFS host may detect the memory card by determining that the C/D pad is at or near ground (i.e., near zero volts or below some low threshold voltage).

According to an example of the present technology, the C/D pad may also be used by a memory card to detect a UFS host. When the C/D pad of a memory card is physically and electrically connected to a corresponding C/D host contact, the host contact applies a voltage, which causes some current to flow to ground. This voltage or current may be detected on the memory card side. For example, some resistance may be provided between the C/D pad and ground and the voltage drop across this resistance may indicate current flow from a C/D host contact of a UFS host. Increased voltage at the C/D pad (above ground) may be used to identify when a UFS host is applying a voltage to the C/D pad.

Figure 13:
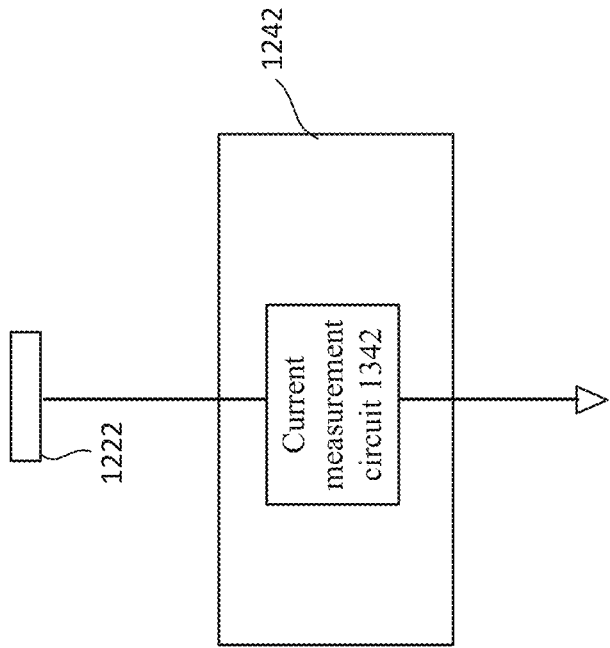
FIG. 13 illustrates an example of a detection circuit.

FIG. 13 shows an example of detection circuit 1242, which may be implemented in any of the memory cards of the above examples. Detection circuit 1242 is configured to detect when C/D pad 1222 is connected to a UFS host. When a corresponding host contact of a UFS host is in contact with C/D pad 1222 it applies a voltage, VDD (e.g., 1.8 volts), which is detected by voltage detection circuit 1340. Switch 1341 is open initially to isolate pad 1222 from ground and enable the voltage to rise when connected to VDD so that it is detected. After voltage detection circuit 1340 detects the voltage (e.g., voltage above a threshold) and detection circuit 1242 determines that the memory card is connected to a UFS slot, switch 1341 closes to connect pad 1222 to ground and thereby enable the host to detect the presence of a UFS card. Detection circuit 1242 may be considered an example of means for detecting connection to a UFS host.

Figure 14A:
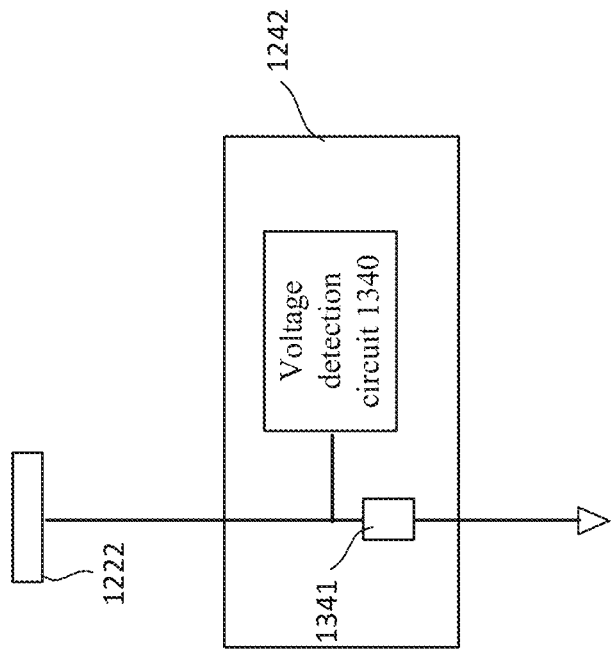
FIG. 14A illustrates another example of a detection circuit.

FIG. 14A shows an alternative arrangement for detecting a UFS host that may be implemented in any of the memory cards described above. In this example, current measurement circuit 1342 of detection circuit 1242 measures current flow from pad 1222 to ground. In this example, no switching may be required (e.g., current may flow and be detected by current measurement circuit 1342 without affecting detection by a UFS host).

Figure 14B:
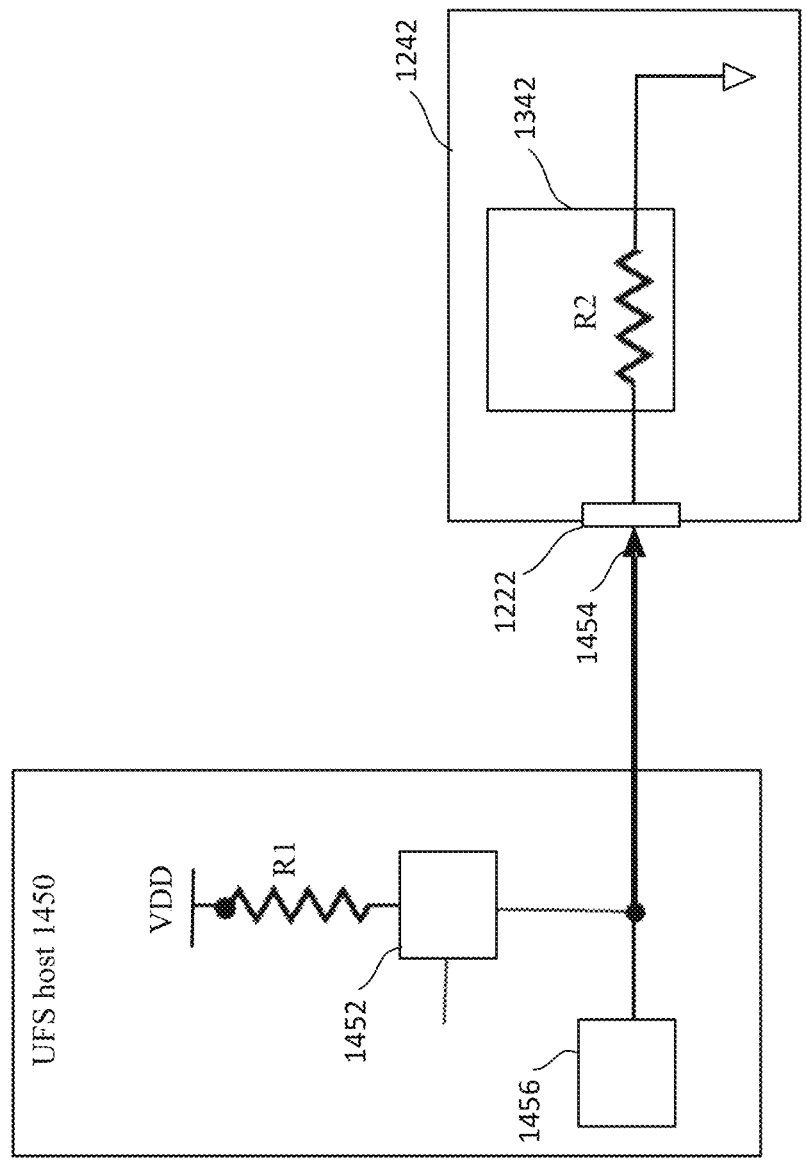
FIG. 14B illustrates an example implementation of the detection circuit of FIG. 14A.

FIG. 14B shows an implementation of current measurement circuit 1342 in detection circuit 1242 and also shows UFS host 1450, which applies a voltage, VDD, through resistor R1 and switch 1452 to C/D host contact 1454. Detection circuit 1456 is provided in UFS host 1450 to detect a drop in voltage at C/D host contact 1454 when it connects to ground through C/D pad 1222. A resistor R2 is provided in current measurement circuit 1342 between pad 1222 and ground and current passing through R2 is measured (e.g., the voltage difference across R2 may be measured to obtain current). While resistor R2 may cause some increase in voltage at pad 1222 (i.e., voltage above zero volts), if R2 is sufficiently small compared with R1 then the increased voltage may be sufficiently small so that detection circuit 1456 is unaffected. For example, where VDD is 1.8 volts, R1 is 4.7 kOhms, and detection circuit 1456 is configured to switch at 0.58 volts (detects a UFS card when voltage is below 0.58 volts) R2 may be less than about 2.23 kOhms.

Figure 15:
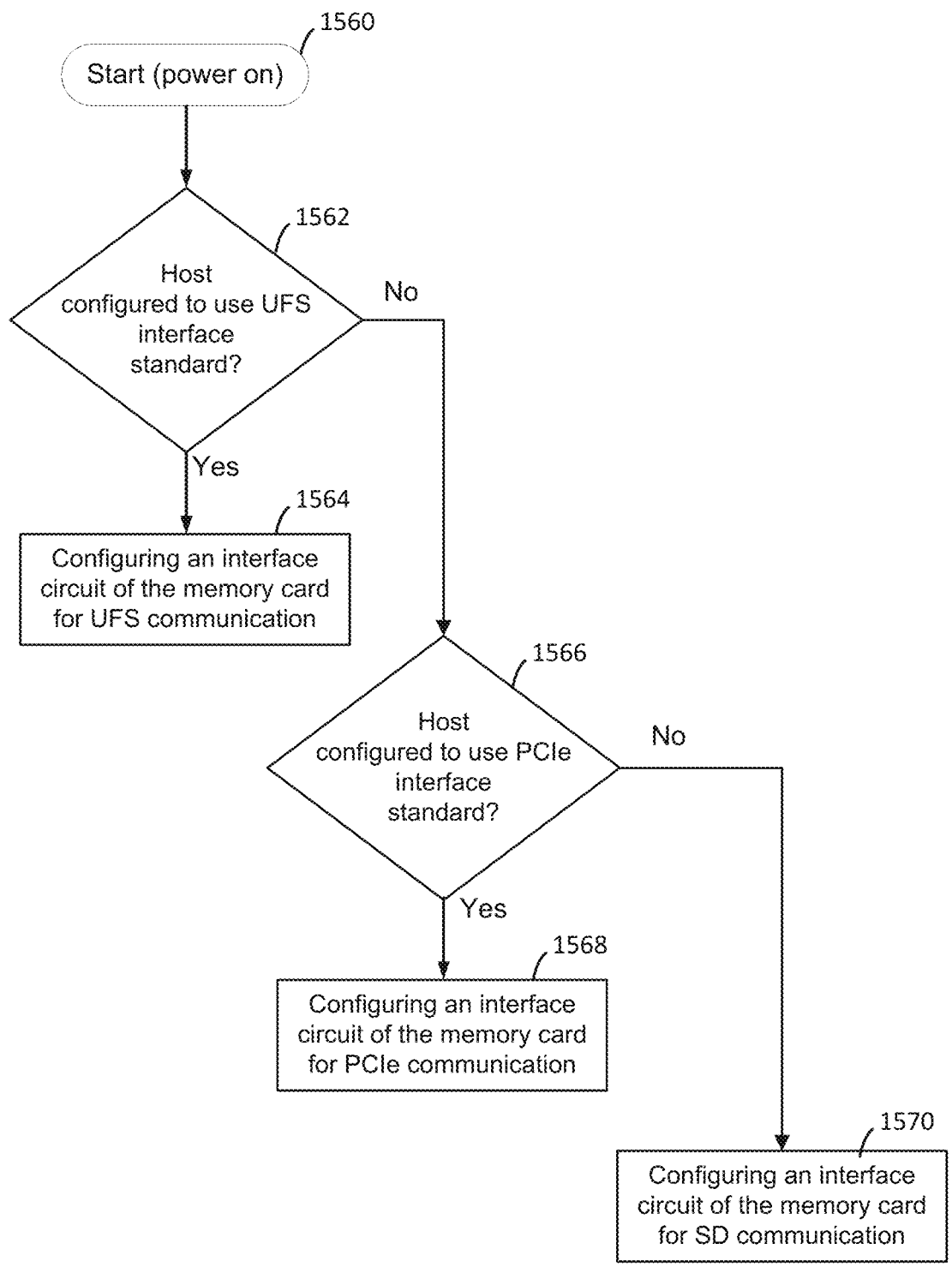
FIG. 15 illustrates a method that may be used in a memory card.

When a memory card that is operable with multiple host interfaces is powered on, it may perform a detection and configuration operation to detect the host interface and configure interface circuits for communication with the host accordingly. FIG. 15 shows an example of steps of a method of detection (e.g., using one of the circuits of FIGS. 13-14B or other such circuit) and configuration that may be implemented with any of the memory cards described above that are operable with multiple host interface standards.

At the start of the operation 1560 (e.g. when a memory card is powered on as a result of being inserted in a slot and having a power supply voltage supplied to power supply pads), the method includes detecting whether a host that is connected to the memory card (operable with multiple host interface standards) is configured to use a Universal Flash Storage (UFS) interface standard 1562 and, in response to determining that the host is configured to use the UFS interface standard, configuring an interface circuit of the memory card for UFS communication 1564. In response to determining that the host is not configured to use the UFS interface standard, the method includes determining whether the host is configured to use a Peripheral Component Interface express (PCIe) interface standard 1566. In response to determining that the host is configured to use the PCIe interface standard, the method includes configuring the interface circuit of the memory card for PCIe communication 1568 and in response to determining that the host is not configured to use the PCIe interface standard, configuring the interface circuit of the memory card for communication using a Secure Digital (SD) interface standard 1570.

An example of a memory card includes a plurality of pads disposed on a surface of the memory card, the plurality of pads including a first set of pads located to connect with host contacts arranged in a first configuration for communication according to a micro Secure Digital (microSD) standard, a second set of pads located to connect with host contacts arranged in a second configuration for communication according to a Peripheral Component Interface express (PCIe) standard, and a third set of pads located to connect with host contacts arranged in a third configuration for communication according to a Universal Flash Storage (UFS) standard, the plurality of pads including one or more common pads that are common to the second set of pads and the third set of pads.

In an example, the first set of pads includes a plurality of microSD pads located a first distance from a leading edge of the memory card, the second set of pads includes one or more dedicated PCIe pads located a second distance from the leading edge of the memory card, the third set of pads includes one or more dedicated UFS pads located a third distance from the leading edge of the memory card, and the common pads are elongated along a direction perpendicular to the leading edge of the memory card and extend between the first distance and the second distance.

In an example, the plurality of microSD pads are arranged in a first row to engage with corresponding microSD host contacts, the one or more dedicated PCIe pads are arranged in a second row to engage with corresponding PCIe host contacts, the one or more dedicated UFS pads are arranged in a third row to engage with corresponding UFS host contacts, and each of the common pads extends from the second row to the third row to engage with a corresponding PCIe host contact at a first location and with a corresponding UFS host contact at a second location.

In an example, the common pads include one or more common pads configured to receive a constant voltage from a PCIe host contact and from a UFS host contact.

In an example, the common pads include two or more common data pads configured to transfer data between the memory card and a PCIe host through PCIe host data contacts and between the memory card and a UFS host through UFS host data contacts.

In an example, the two or more common data pads include a first pair of pads for receiving data through PCIe host data contacts or UFS host data contacts and a second pair of pads for sending data through PCIe host data contacts or UFS host data contacts.

In an example, the first set of pads includes a plurality of microSD pads located a first distance from a leading edge of the memory card, the second set of pads includes one or more dedicated PCIe pads located a second distance from the leading edge of the memory card, the one or more dedicated PCIe pads including a PCIe supply voltage pad, the third set of pads includes one or more dedicated UFS pads located a third distance from the leading edge of the memory card, the one or more dedicated UFS pads including a UFS card detect pad, the common pads extend between the first distance and the second distance and include three common pads configured to receive a constant voltage and four common pads for data communication.

In an example, the memory card includes one or more circuits configured to detect connection to a UFS host.

In an example, the third set of pads includes a UFS card detect pad and the one or more circuits are configured to detect a voltage provided by a host to the UFS card detect pad and connect the UFS card detect pad to ground in response to detecting connection to a UFS host.

In an example, the third set of pads includes a UFS card detect pad and the one or more circuits are configured to detect a current flowing from the card detect pad to ground.

In an example, the one or more circuits are configured to initiate communication using the UFS interface standard in response to detecting connection to a UFS host including configuring two pairs of common pads for UFS data communication.

In an example, the memory card has a form factor of a microSD (OD) card or of a UFS card.

In an example, the plurality of pads includes one or more power supply pads that are common to the first set, the second set, and the third set of pads.

An example of a method includes detecting whether a host that is connected to a memory card operable with multiple host interface standards is configured to use a Universal Flash Storage (UFS) interface standard, in response to determining that the host is configured to use the UFS interface standard, configuring an interface circuit of the memory card for UFS communication and in response to determining that the host is not configured to use the UFS interface standard, determining whether the host is configured to use a Peripheral Component Interface express (PCIe) interface protocol. The method further includes, in response to determining that the host is configured to use the PCIe interface protocol, configuring the interface circuit of the memory card for PCIe communication, and in response to determining that the host is not configured to use the PCIe interface protocol, configuring the interface circuit of the memory card for communication using a Secure Digital (SD) interface standard.

In an example, detecting whether the host is configured to use the UFS interface standard includes detecting a voltage on a UFS card detect pad and in response to detecting connection to a UFS host, connecting the card detect pad to ground.

In an example, detecting whether the host is configured to use the UFS interface standard includes detecting a current flowing from the card detect pad to ground.

In an example, configuring the interface circuit of the memory card for UFS communication includes configuring the interface circuit to receive a clock signal on a common pad and configuring the interface circuit of the memory card for PCIe communication includes configuring the interface circuit to receive a power supply voltage on the common pad.

An example of a data storage system includes a plurality of pads disposed on a first surface of a memory card, the plurality of pads including a first set of pads located along a first row to connect with host contacts arranged in a first configuration for communication according to a Secure Digital (SD) standard; a second set of pads located along a second row to connect with host contacts arranged in a second configuration for communication according to a high-speed interface protocol; a third set of pads located along a third row to connect with host contacts arranged in a third configuration for communication according to a Universal Flash Storage (UFS) standard, the third set of pads including a plurality of common pads that are common to the second set of pads and that extend across the second and third rows to connect with host contacts arranged in the second configuration or the third configuration; and means for detecting connection to a UFS host.

In an example, the data storage system may further include means for configuring interface circuits connected to the plurality of pads for communication according to the UFS interface standard for communication with a UFS host, for communication according to the high-speed interface protocol for communication with a high-speed host, and for communication according to the microSD standard for communication with a microSD host.

In an example, the high-speed interface protocol is one of Peripheral Component Interface express (PCIe) protocol or Ultra High Speed-II (UHS-II).

The foregoing detailed description of the invention has been presented for purposes of illustration and description. It is not intended to be exhaustive or to limit the invention to the precise form disclosed. Many modifications and variations are possible in light of the above teachings. The described embodiments were chosen in order to best explain the principles of the invention and its practical application, to thereby enable others skilled in the art to best utilize the invention in various embodiments and with various modifications as are suited to the particular use contemplated. It is intended that the scope of the invention be defined by the claims appended hereto.

We claim:

1. A memory card, comprising:
   a plurality of pads disposed on a surface of the memory card, the plurality of pads including:
   a first set of pads located to connect with host contacts arranged in a first configuration for communication according to the micro Secure Digital (microSD) standard,
   a second set of pads located to connect with host contacts arranged in a second configuration for communication according to the Peripheral Component Interconnect express (PCIe) protocol, and
   a third set of pads located to connect with host contacts arranged in a third configuration for communication according to the Universal Flash Storage (UFS) standard, the plurality of pads including one or more common pads that are common to the second set of pads and the third set of pads; and
   one or more circuits configured to detect connection to a UFS host.

2. The memory card of claim 1 wherein:
   the first set of pads includes a plurality of microSD pads located a first distance from a leading edge of the memory card;
   the second set of pads includes one or more dedicated PCIe pads located a second distance from the leading edge of the memory card;
   the third set of pads includes one or more dedicated UFS pads located a third distance from the leading edge of the memory card; and
   the common pads are elongated along a direction perpendicular to the leading edge of the memory card and extend between the first distance and the second distance.

3. The memory card of claim 2 wherein:
the plurality of microSD pads are arranged in a first row to engage with corresponding microSD host contacts;
the one or more dedicated PCIe pads are arranged in a second row to engage with corresponding PCIe host contacts;
the one or more dedicated UFS pads are arranged in a third row to engage with corresponding UFS host contacts; and
each of the common pads extends from the second row to the third row to engage with a corresponding PCIe host contact at a first location and with a corresponding UFS host contact at a second location.

4. The memory card of claim 1 wherein the common pads include one or more common pads configured to receive a constant voltage from a PCIe host contact and from a UFS host contact.

5. The memory card of claim 4 wherein the common pads include two or more common data pads configured to transfer data between the memory card and a PCIe host through PCIe host data contacts and between the memory card and a UFS host through UFS host data contacts.

6. The memory card of claim 5 wherein the two or more common data pads include:
a first pair of pads for receiving data through PCIe host data contacts or UFS host data contacts; and
a second pair of pads for sending data through PCIe host data contacts or UFS host data contacts.

7. The memory card of claim 5 wherein:
the first set of pads includes a plurality of microSD pads located a first distance from a leading edge of the memory card;
the second set of pads includes one or more dedicated PCIe pads located a second distance from the leading edge of the memory card, the one or more dedicated PCIe pads including a PCIe supply voltage pad;
the third set of pads includes one or more dedicated UFS pads located a third distance from the leading edge of the memory card, the one or more dedicated UFS pads including a UFS card detect pad; and
the common pads extend between the first distance and the second distance and include three common pads configured to receive a constant voltage and four common pads for data communication.

8. The memory card of claim 1 wherein the one or more common pads include a common pad configured to receive a clock signal in a UFS configuration and receive a power supply voltage in a PCIe configuration.

9. The memory card of claim 1 wherein:
the third set of pads includes a UFS card detect pad; and
the one or more circuits are further configured to detect a voltage provided by a host to the UFS card detect pad and connect the UFS card detect pad to ground in response to detecting connection to a UFS host.

10. The memory card of claim 1 wherein:
the third set of pads includes a UFS card detect pad; and
the one or more circuits are further configured to detect a current flowing from the card detect pad to ground.

11. The memory card of claim 1 wherein the one or more circuits are further configured to initiate communication using the UFS interface standard in response to detecting connection to a UFS host including configuring two pairs of common pads for UFS data communication.

12. The memory card of claim 1 wherein the memory card has a form factor of a microSD card or of a UFS card.

13. The memory card of claim 1 wherein the plurality of pads includes one or more power supply pads that are common to the first set, the second set, and the third set of pads.

14. A method comprising:
determining whether a host that is connected to a memory card operable with multiple host interface standards is configured to use the Universal Flash Storage (UFS) interface standard;
in response to determining that the host is configured to use the UFS interface standard, configuring an interface circuit of the memory card for UFS communication; and
in response to determining that the host is not configured to use the UFS interface standard;
determining whether the host is configured to use the Peripheral Component Interconnect express (PCIe) interface protocol;
in response to determining that the host is configured to use the PCIe interface protocol, configuring the interface circuit of the memory card for PCIe communication; and
in response to determining that the host is not configured to use the PCIe interface protocol, configuring the interface circuit of the memory card for communication using the micro Secure Digital (microSD) interface standard.

15. The method of claim 14, wherein determining whether the host is configured to use the UFS interface standard includes:
detecting a voltage on a UFS card detect pad; and
in response to detecting connection to a UFS host, connecting the card detect pad to ground.

16. The method of claim 14 wherein determining whether the host is configured to use the UFS interface standard includes detecting a current flowing from the card detect pad to ground.

17. The method of claim 14 wherein:
configuring the interface circuit of the memory card for UFS communication includes configuring the interface circuit to receive a clock signal on a common pad; and
configuring the interface circuit of the memory card for PCIe communication includes configuring the interface circuit to receive a power supply voltage on the common pad.

18. A memory card, comprising:
a first surface configured to engage a host;
a plurality of pads disposed on the first surface, the plurality of pads including:
a first set of pads located along a first row to connect with host contacts arranged in a first configuration for communication according to the micro Secure Digital (microSD) standard,
a second set of pads located along a second row to connect with host contacts arranged in a second configuration for communication according to a high-speed interface protocol, and
a third set of pads located along a third row to connect with host contacts arranged in a third configuration for communication according to the Universal Flash Storage (UFS) standard, the third set of pads including a plurality of common pads that are common to the second set of pads and that extend across the second and third rows to connect with host contacts arranged in the second configuration or the third configuration; and means for detecting connection of the memory card to a UFS host via the plurality of pads.

19. The memory card of claim 18 further comprising means for configuring interface circuits connected to the plurality of pads for communication according to the UFS interface standard for communication with a UFS host, for communication according to the high-speed interface protocol for communication with a high-speed host, and for communication according to the microSD standard for communication with a microSD host.

20. The memory card of claim 18 wherein the high-speed interface protocol is one of Peripheral Component Interconnect express (PCIe) protocol or Ultra High Speed-II (UHS-II) protocol.

\* \* \* \* \*